(12) United States Patent
Brandelli

(10) Patent No.: US 6,712,090 B1
(45) Date of Patent: Mar. 30, 2004

(54) HYDRAULIC VALVE

(76) Inventor: Anthony Brandelli, 2418 W. 256th St., Lomita, CA (US) 90717

( * ) Notice: Subject to any disclaimer, the term of this patent is extended or adjusted under 35 U.S.C. 154(b) by 16 days.

(21) Appl. No.: 10/154,096

(22) Filed: May 22, 2002

(51) Int. Cl.$^7$ .......................... F16K 31/20; F16K 31/34; F16K 31/385

(52) U.S. Cl. ...................... 137/414; 73/322.5; 137/426; 137/430; 137/432; 137/436; 137/437; 137/441; 137/444; 137/410; 285/81; 285/89; 285/343; 285/355; 285/356; 285/357

(58) Field of Search .................. 137/410, 414, 137/426, 430, 432, 441, 444, 436, 437; 73/322.5; 285/81, 89, 343, 355, 356, 357

(56) References Cited

U.S. PATENT DOCUMENTS

| | | | | |
|---|---|---|---|---|
| 3,115,153 A | * | 12/1963 | Delamater | 137/432 |
| 3,135,287 A | * | 6/1964 | Kepka et al. | 137/414 |
| 3,144,874 A | * | 8/1964 | Goldtrap | 137/414 |
| 3,144,875 A | * | 8/1964 | Goldtrap | 137/414 |
| 3,321,972 A | * | 5/1967 | Goldtrap | 137/414 |
| 3,429,333 A | | 2/1969 | Schoepe et al. | 137/414 |
| 3,495,803 A | * | 2/1970 | Schoepe et al. | 137/414 |
| 3,584,644 A | * | 6/1971 | Morken | 137/426 |
| 3,729,017 A | | 4/1973 | Brandelli | 137/414 |
| 4,100,928 A | | 7/1978 | Schoepe | 137/414 |
| 4,122,862 A | | 10/1978 | Brandelli | 137/437 |
| 4,186,765 A | * | 2/1980 | Anderson | 137/432 |
| 4,341,238 A | * | 7/1982 | Roosa et al. | 137/414 |
| 4,573,495 A | * | 3/1986 | Rothe et al. | 137/432 |
| 4,842,011 A | * | 6/1989 | Roosa | 137/432 |
| 5,007,452 A | * | 4/1991 | Antunez | 137/432 |
| 5,035,257 A | * | 7/1991 | Antunez | 137/432 |
| 5,150,732 A | * | 9/1992 | Antunez | 134/414 |
| 5,318,062 A | * | 6/1994 | Antunez | 137/414 |
| 6,047,725 A | * | 4/2000 | Gish et al. | 137/414 |

OTHER PUBLICATIONS

Fluidmaster 400A Fill Valve Installation Instructions; Fluidmaster, Inc. Part #4–146; Rev. 6; Jul., 2001.
How a Typical Poppet Valve Works, Fluidmaster, Inc. FM 5581, Jul., 1987, 2M.
Ballcocks and Flush Valves; Homeowners How To Hand Book 4 Winter 1976 FM 5582 5M Sep., 1981.

* cited by examiner

Primary Examiner—George L. Walton
(74) Attorney, Agent, or Firm—Charles H. Thomas

(57) ABSTRACT

A fluid tank valve assembly of the type employed for water tanks for toilets has a tank refill valve located atop a fluid inlet supply tube. The refill valve has a lever that is raised and lowered to open and close the valve. An inverted, cup-shaped hood is positioned atop the valve and a float is located about the skirt of the hood and secured thereto by the force of friction. The float can be moved longitudinally along the skirt of the hood in order to vary the water level at which the hood bears down upon the lever arm or is lifted from the lever arm, thereby varying the water level at which the valve is actuated. The valve itself is equipped with a metering pin that is configured to reduce the likelihood of clogging in the longitudinal passage of the core of the valve diaphragm. A unique coupling between the water inlet supply tube and the hollow mount at the bottom of the tank prevents complete separation of the water inlet supply tube relative to the mount, but permits longitudinal adjustment therebetween so as to vary the height at which the refill valve is mounted within the tank.

17 Claims, 13 Drawing Sheets

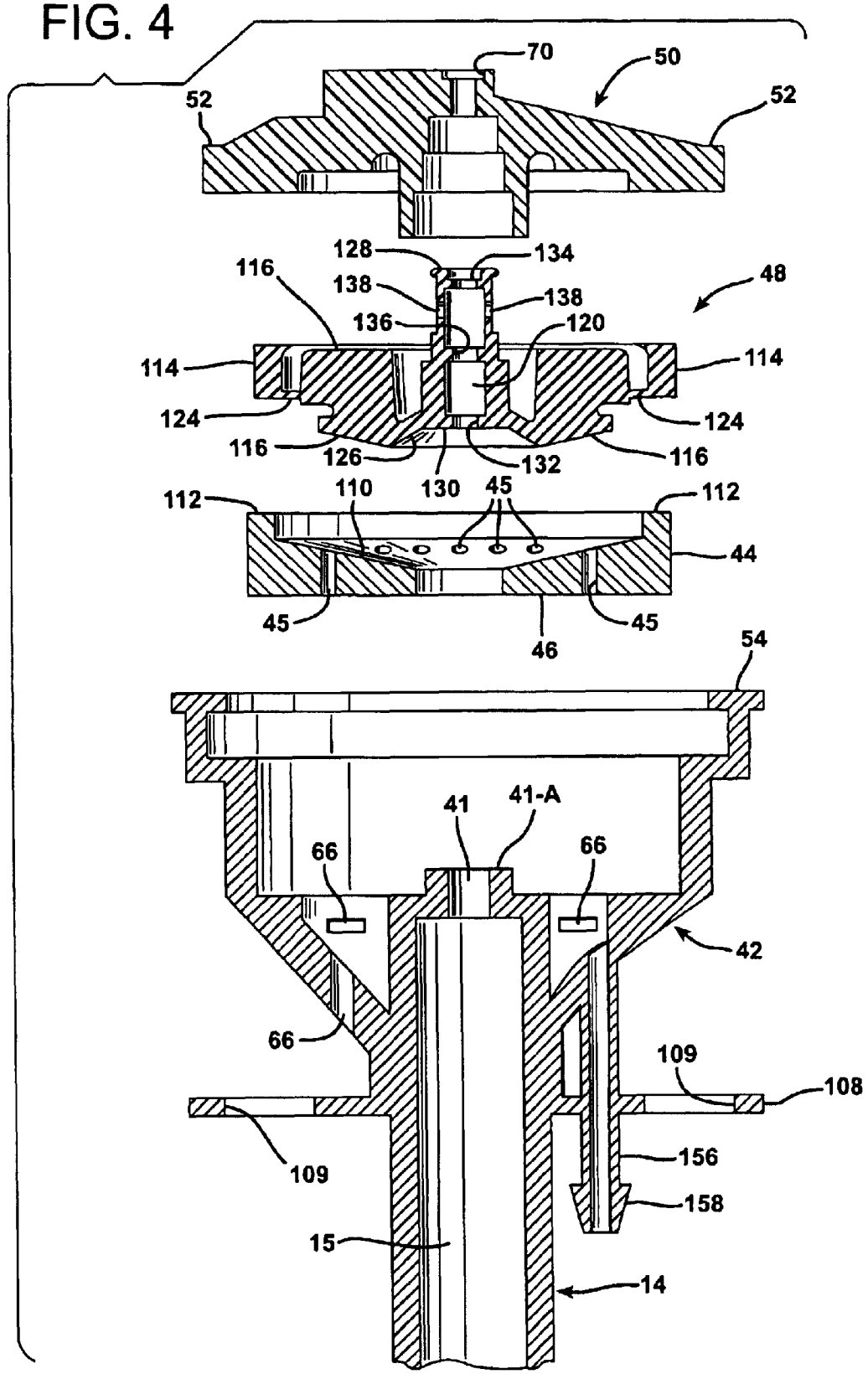

HYDRAULIC VALVE

BACKGROUND OF THE INVENTION

1. Field of the Invention

The present invention relates to a fluid tank valve, particularly a hydraulic refill valve, especially adapted for use in controlling the level of a liquid within a tank.

2. Description of the Prior Art

Hydraulic valves have been used for many years for controlling the level of a liquid within a tank. Such valves are widely utilized in the plumbing industry, particularly in regulating the flow of water into the tank of a toilet, sometimes termed a water closet. Conventional valves of this type, often called ballcock valves, are described, for example, in U.S. Pat. Nos. 3,429,333 and 4,100,928.

While some changes have been made in the construction of ballcock valves throughout the years, the operating mechanisms of conventional, commercially available ballcock valves sold for use in toilets have remained largely standardized for many years. For example, ballcock valves similar to the type described in U.S. Pat. No. 4,100,928 are widely sold throughout the United States and elsewhere by Fluidmaster Inc., located at 30800 Rancho Viejo Road, San Juan Capistrano, Calif. 92675 as the FLUIDMASTER® 400A fill valve.

Conventional valves of this type are typically mounted in the tank of a toilet. An upright fluid supply tube extends upwardly from a hollow mount located on the bottom of the tank at the fluid inlet. The fluid supply tube terminates in a fluid supply outlet at its upper extremity which opens into a valve enclosure. A resilient, flexible diaphragm is mounted within the valve enclosure and is secured relative to the enclosure about its periphery. The diaphragm has a central, tubular core with a vertical passage defined therethrough. Lower and upper sealing rings are located at the lower and upper ends of the diaphragm core and project radially inwardly into a longitudinal passage through the core at the lower and upper ends of the core, respectively. An intermediate sealing ring projects radially inwardly into the longitudinal passage between the upper and lower ends of the diaphragm core. One or more bleed apertures extend radially through the wall of the diaphragm core. The bleed apertures provide a flow path between the central, axial, longitudinal passage within the confines of the core and a back-pressure chamber located above and exteriorly of the diaphragm body and within the confines of the structures forming the valve enclosure.

A metering pin extends longitudinally down the center of the diaphragm core passage. The metering pin includes radially enlarged sealing portions separated by radially reduced portions. The metering pin is raised and lowered by a valve lever arm coupled to a float so that, when the water level in the tank rises, the valve lever is actuated to lower the metering pin to a position in which one of the radially enlarged portions of the metering pin blocks the valve passage at the upper sealing ring. A limited flow of water is then permitted up through the lower sealing ring and past the intermediate sealing ring through the bleed apertures to the back-pressure chamber. Pressure is thereby allowed to build up in the back-pressure chamber, which then closes the body of the valve against a valve seat at the fluid supply outlet. This blocks flow from the fluid supply tube to outlet ports in the valve, thus shutting off the flow of water into the tank.

When the toilet is flushed the float drops due to the falling water level within the toilet tank. This action operates the valve lever arm, raising the metering pin which then unblocks the upper sealing ring. The back-pressure chamber is thereby vented to atmosphere through the bleed apertures. The pressure of water from the fluid supply tube thereupon forces the body of the valve up from the valve seat, thereby permitting the flow of water from the fluid supply tube to the valve outlet ports. This fluid flow ultimately fills the tank, whereupon the float rises to operate the actuating lever arm to again lower the metering pin. With the upper sealing ring again blocked, pressure rebuilds in the back-pressure chamber to again force the body of the valve into a sealing relationship with the valve seat.

The longitudinal fluid passage within the diaphragm core is quite small, and the annular orifices around the metering pin are even smaller. Consequently, even very tiny particulates of sediment, sand, scum, or dirt can cause a blockage within the valve orifices, central passage, or bleed apertures through the wall of the core. The valve will thereafter operate improperly until repaired or replaced.

Clogging of the valve passage is particularly likely since at least a portion of the passage through the core is open to fluid when the metering pin is reciprocated to unseat the body of the valve from the valve seat. At this point in the operation of the valve there is a considerable onrush of water directed straight up into the passage. Consequently, it is not at all unusual for small particles of sediment or grit to enter the lower portion of the passage through the diaphragm core when the body of the valve is unseated. Such particulate matter is then very likely to lodge within the flow pathways through the core of the diaphragm as it is carried by the water passing into and through the diaphragm.

Another problem that has persisted in the operation of conventional ballcock valves is the rather lengthy fill time and noisy operation of the valve, particularly as it approaches a closed condition. This problem occurs due to the inordinately long lever arm that is utilized to manipulate the metering pin. Because of the long lever arm, the enlarged portion of the metering pin that seals against the upper sealing ring approaches the upper sealing ring quite slowly. As a consequence, the rate at which pressure builds up in the back-pressure chamber rises progressively, but very slowly, thus lengthening the time required for sufficient pressure to build up in the back-pressure chamber to seat the body of the diaphragm against the valve seat. During this time there is an annoying hissing noise due to the slow passage of water past the metering pin and through the upper sealing ring.

One of my prior patents, U.S. Pat. No. 3,729,017, incorporated herein by reference in its entirety, addresses this problem. The system described in this patent allows the lever arm operating the metering pin to be shortened considerably by the utilization of an inverted, cup-shaped float disposed atop the valve. The lever arm that operates the metering pin described in this patent is enclosed entirely within the confines of the cup-shaped float. The length of the lever arm is thereby greatly reduced from other conventional ballcock valves. When the water level in the tank drops, the roof of the cup-shaped float bears downwardly on the distal end of the lever arm, thereby forcing it downwardly to operate the metering pin in a desired direction. When the level of water within the tank rises, it lifts the float with it, thus relieving the downward pressure of the roof of the float against the distal end of the lever arm. A spring thereupon urges the distal end of the lever arm upwardly, thereby moving the metering pin in the opposite direction.

While the foregoing system does have the desired effect of reducing the fill time and the duration of the noisy operation of the valve as it nears closure, there is no convenient means for making adjustments so that the valve is actuated at a selected level of water in the tank. Such adjustments are important due to the many variations in the height at which the valve is mounted above the bottom of the tank, the height to which the overflow pipe extends above the bottom of the tank, and other variations in ballcock valve configuration that require small, but important adjustments in the level of water in the tank at which the valve is operated. The improved valve of the present invention provides a simple, but novel solution to this problem.

A further problem that exists in the conventional construction of ballcock valves is that the height adjustment mechanisms employed to vary the height at which the valve is mounted above the floor of the tank allow the components of the upright fluid supply tube to become totally separated from each other. The upright fluid supply tube and its mounting assembly are typically formed of telescoping members having a seal therebetween. A clamping mechanism is provided to allow the telescoping members to be adjusted and secured in fixed relationship to each other. I have described one such coupling mechanism in my prior U.S. Pat. No. 4,122,862, which is also incorporated herein by reference in its entirety.

However, I have since discovered that it is all too easy for the component telescoping members of the fluid supply tube and its tank bottom mount to become totally separated from each other while the installer adjusts the height of the valve above the bottom of the tank. Thus, during installation the installer is likely to find that the upper portion of the upright fluid supply tube has become completely detached from the lower portion that is mounted to the bottom of the tank. The necessity for reconnecting these members thus represents an annoyance and lengthens the time required to perform the installation of the ballcock valve. However, by providing a simple but important modification to the system of my prior U.S. Pat. No. 4,122,862 this problem can be completely avoided.

The unique fluid tank valve assembly and the refill valve construction of the present invention provide novel and useful solutions to all of the foregoing problems hereinbefore identified, as well as other advantages in the field of fluid valves, particularly hydraulic valves.

SUMMARY OF THE INVENTION

In one broad aspect the present invention may be considered to be a fluid tank valve assembly comprising: a tank having a bottom; an upright fluid supply tube projecting upwardly relative to the bottom of the tank; a tank refill valve located atop the fluid supply tube and having at least one outlet port to the tank therefrom and operable between a valve seating position blocking fluid flow from the fluid supply tube to the outlet port and a valve unseating position permitting fluid flow from the fluid supply tube to the outlet port; a float lever assembly located atop the refill valve and having a lever arm movable between a raised position to operate the refill valve to one of the valve seating and unseating positions and a lowered position to operate the valve to the other of the valve seating and unseating positions; an inverted, cup-shaped valve actuating hood disposed atop the valve lever assembly, wherein the valve actuating hood has a roof and a skirt depending from the roof and surrounding the refill valve; and a buoyant float engaged with the skirt of the valve actuating hood and adjustably positionable along the skirt to a selected distance from the roof, whereby the roof of the valve bears downwardly against the lever arm to force said lever arm to the lowered position until fluid level in the tank rises sufficiently to cause the float to lift the valve actuating hood and move the lever arm to the raised position.

The foregoing construction represents a feature of the present invention that is a significant improvement over my prior U.S. Pat. No. 3,729,017. In that prior patent, I utilized a cup-shaped float that rotated the lever arm which operates the refill valve mechanism. However, in that prior patent there was no system for easily adjusting the level of water in the tank at which valve actuation would occur.

According to the present invention I have modified the prior system by replacing the inverted cup-shaped float that operated the valve lever arm directly, with a cup-shaped hood that is not buoyant and which is not raised or lowered directly by a change of water level in the tank. However, I have attached to this hood a float that can be secured to the hood at a selected longitudinal position relative thereto. A spring may be provided to bias the float lever arm toward the raised position, Preferably, the skirt of the hood has a cylindrical, annular shape and the float also has an annular configuration and is disposed about the skirt in contact therewith. Preferably also, the float includes a plurality of radially inwardly protruding projections, such as longitudinally extending ribs, that contact and reside in frictional engagement with the outer surface of the skirt. The longitudinal position of the float relative to the hood may be adjusted by overcoming the frictional force and sliding the ribs longitudinally toward the transverse roof so that the float will lift the hood, thus moving the valve lever arm to its raised position, only when the water within the tank has risen to a relatively high level. Conversely, by overcoming the force of friction and sliding the float longitudinally toward the lower, open end of the skirt, a relatively low level of water within the tank will raise the float, thereby causing the lever arm to be pushed to its raised position. Infinitely variable adjustments to the refill valve actuating level of water within the tank may thereby be performed in this manner.

In another broad aspect the invention may be considered to be the construction of the refill valve itself. The refill valve of the invention is comprised of an upright fluid supply tube; a flexible, resilient, annular valve diaphragm; a metering pin; and a float lever assembly. The upright fluid supply tube terminates in a fluid supply outlet at its upper extremity. The diaphragm is housed within a valve enclosure atop the fluid supply outlet and is operable to alternatively seal and unseal the fluid supply outlet. The diaphragm has a central, annular, tubular core that defines a longitudinal passage therethrough. The diaphragm core has upper and lower ends and defines a lower sealing ring at its lower end, an upper sealing ring at its upper end, and an intermediate sealing ring located between the upper and lower ends. The lower, upper and intermediate sealing rings project radially into the longitudinal passage of the core. The diaphragm core further defines at least one bleed aperture, and preferably diametrically opposed bleed apertures, located between the upper and intermediate sealing rings. The bleed aperture or apertures extend radially through the core.

The metering pin is disposed in the longitudinal passage and has a plurality of radially enlarged sealing portions and radially reduced portions arranged longitudinally thereon. The float lever assembly is coupled to the metering pin and is operable to alternatively advance and retract the metering pin in the longitudinal passage. The metering pin is movable to a valve unseating position in which the enlarged sealing portions of the metering pin reside in sealing engagement with the lower and intermediate sealing rings of the diaphragm while the radially reduced portions permit fluid flow through the bleed aperture or apertures and out of the upper end of the longitudinal passage so that the diaphragm unseats the fluid supply outlet. Alternatively, the float lever assembly is operable to move the metering pin to a valve seating position in which one of the enlarged sealing portions of the metering pin resides in sealing engagement with the upper sealing ring while the radially reduced portions of the metering pin permit metered flow of fluid from the supply tube outlet past the lower and intermediate sealing rings and through the bleed aperture or apertures so that the diaphragm seals the fluid supply outlet.

The diaphragm employed in the refill valve of the invention is the same diaphragm that is employed in the conventional FLUIDMASTER® 400A fill valve. This diaphragm is largely depicted and described in prior U.S. Pat. Nos. 3,429,333 and 4,100,928, but may be modified. The metering pin employed, however, differs significantly from the metering pins utilized in these prior art ballcock valves.

Specifically, and unlike the prior, conventional ballcock valves described, the metering pin of the present invention is configured to simultaneously seal both the lower and intermediate sealing rings when the valve lever arm actuates the valve to its unseated position. Unlike prior systems, the lower portion of the longitudinal passage through the core of the diaphragm is thereby closed both at the intermediate sealing ring in the diaphragm core beneath the bleed apertures and at the lower sealing ring during the time that there is a significant liquid flow from the upright fluid supply tube past the valve seat. Consequently, and because this portion of the longitudinal passage is totally closed, dirt, sediment, particulate matter, and scum cannot enter into that portion of the passage during the time that a large volumetric flow of liquid through the valve occurs. As a result, the refill valve of the present invention is far less likely to clog than conventional, prior ballcock valves of this type.

Still another aspect of the invention resides in the coupling system employed for the hollow, upright fluid supply tube leading to the refill valve. The coupling is secured to the bottom of the tank at a fluid inlet thereto and includes a hollow, cylindrical, annular mount for attachment to the fluid inlet at the bottom of the tank. The hollow mount defines a lower, internally threaded barrel and a cavity beneath the barrel having a diameter greater than the interior diameter of the barrel. A downwardly facing annular ledge is formed between the internally threaded barrel and the cavity. The lower end of the upright fluid supply tube has external threads and is threadably engaged in the barrel.

According to the improvement of the invention the lower extremity of the supply tube is configured with a catch that when unrestrained, extends radially outwardly beyond the external threads on the lower end of the fluid supply tube. The catch is resiliently deflectable radially inwardly to pass through the barrel as the lower end of the supply tube is threadably advanced into the barrel. The catch springs outwardly upon entering the cavity in the mount, whereby the catch and the ledge interact to prevent complete separation of the supply tube from the mount while permitting longitudinal adjustment therebetween.

The invention may be described with greater clarity and particularity by reference to the accompanying drawings.

DESCRIPTION OF THE DRAWINGS

FIG. 4 is an exploded, sectional view illustrating the diaphragm and the valve enclosure shown in FIGS. 2A through 3B.

DESCRIPTION OF THE EMBODIMENT

Figure 1:
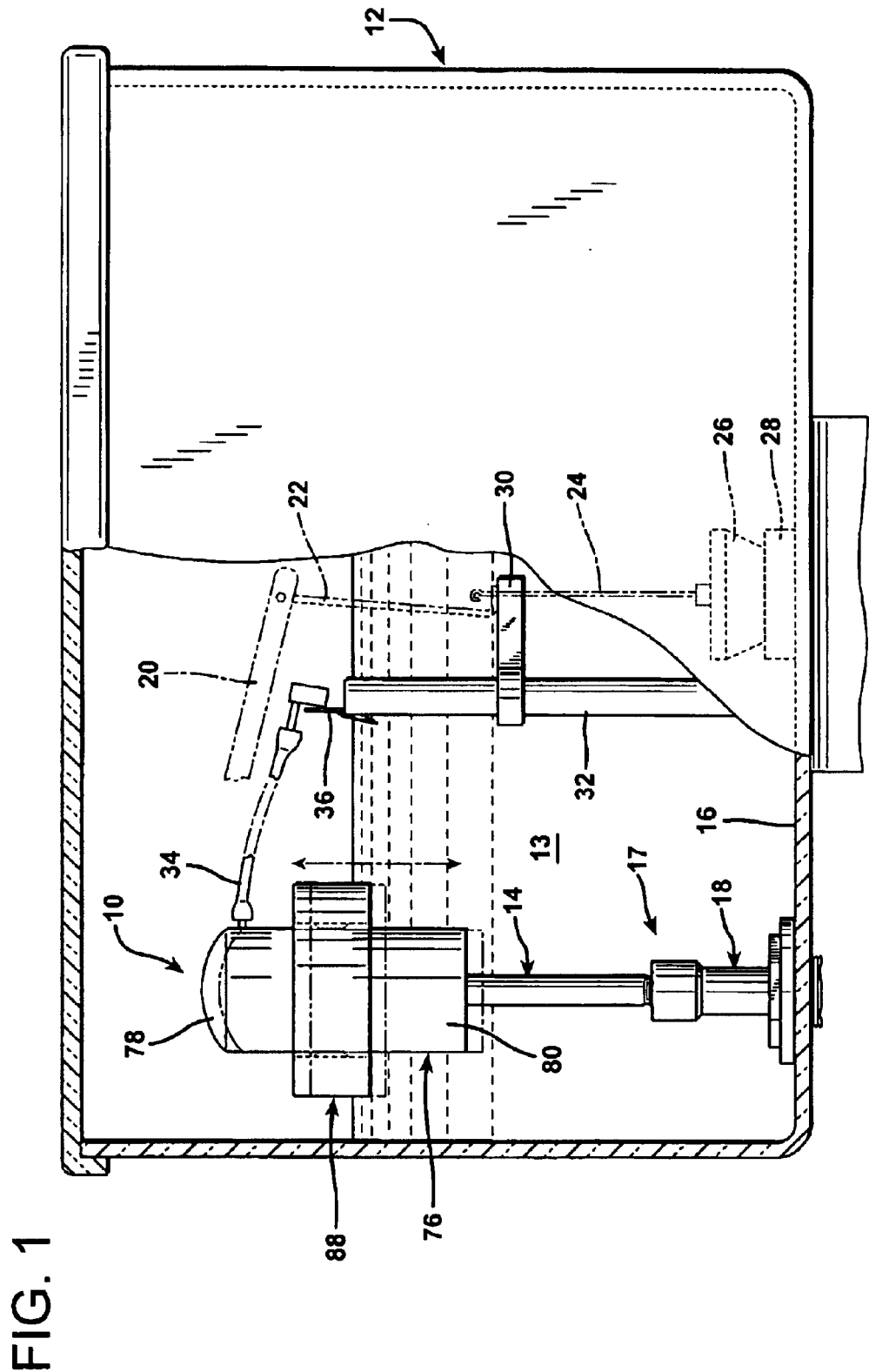
FIG. 1 is an elevational view, partially broken away, illustrating the fluid tank valve assembly and the refill valve and fluid supply coupling of the present invention as installed in a water closet tank for a conventional toilet.

FIG. 1 illustrates a ballcock valve assembly 10 according to the invention located in the conventional flush tank 12 of a toilet water closet. The tank 12 is normally filled with water 13, to a maximum level 100, as illustrated. The ballcock valve assembly 10 is mounted atop an upright fluid supply pipe 14 that is secured to the bottom 16 of the tank 12 by means of a mounting coupling 17, hereinafter to be described.

Figure 5:
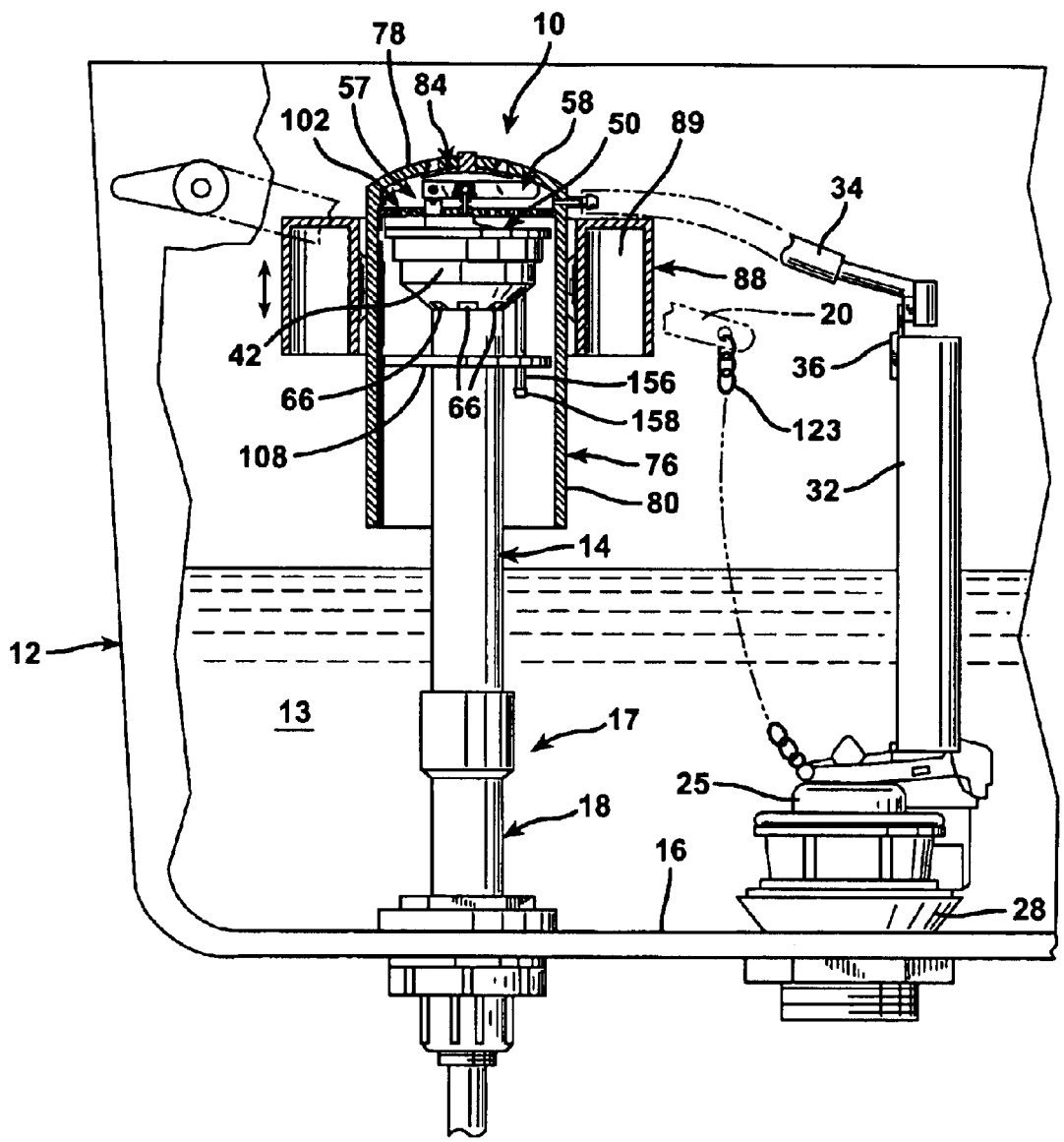
FIG. 5 is an elevational view, partially in section and partially broken away, of a portion of the water closet tank shown in FIG. 1 while being filled.
Figure 5A:
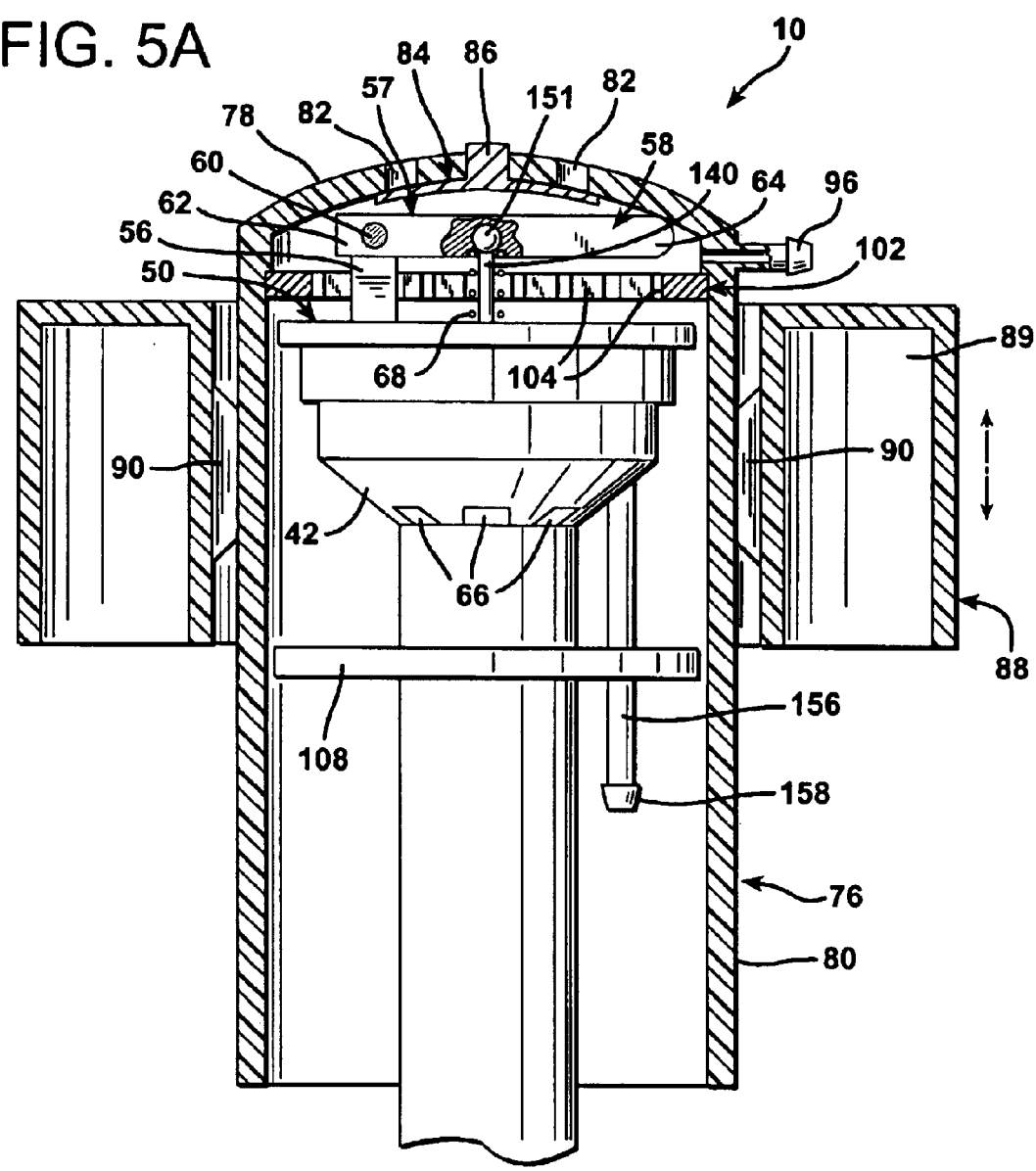
FIG. 5A is an enlarged detail of a portion of a portion of FIG. 5.

The remaining components of the flush tank 12 are of a conventional design and include a flushing arm 20 actuated by a conventional flush lever (not shown) to raise lift wires 22 and 24 to unseat a stopper 26 from a flush valve seat 28 that in turn leads to a toilet bowl (not shown). The lower lift wire 24 is guided through an opening in a horizontally projecting guide wire bracket 30 that is secured to a hollow, vertical overflow pipe 32 that also leads to the toilet. Alternatively, a chain 23 may be connected from the flushing arm 20 directly to the movable end of a flapper valve 25, as shown in the arrangement of FIG. 5. A flexible, rubber overflow hose 34 leads from the refill valve assembly 10 to the top of the overflow pipe 32 and is secured thereto by a stainless-steel clip 36.

The fluid supply tube 14 defines an elongated, upright water supply passageway 15. At its upper extremity the upright fluid supply tube 14 supports a refill valve mechanism 40, illustrated in FIGS. 2A through 3B. The valve mechanism 40 is located atop the fluid supply tube 14, which, at its upper extremity, defines a fluid supply outlet 41 surrounded by a valve core seat 41-A. Beneath the fluid supply outlet 41 the molded structure forming the fluid inlet supply tube 14 also spreads radially outwardly and upwardly to form a diaphragm cup 42. In the bottom of the diaphragm cup 42 there is a separable component which is an annular, generally disc-shaped valve seat 44 that has a lower surface 46 that rests upon the diaphragm cup 42. The upper surface of the valve seat 44 provides a floor with an area 110 upon which a flexible, resilient, annular rubber valve diaphragm 48 is seated. A plurality of vertical flow ducts 45 are formed through the valve seat 44 at a predetermined radial distance from the fluid supply outlet 41. Together the diaphragm cup 42 and the valve seat 44 form a diaphragm support for the diaphragm 48.

A valve cover 50 is secured atop the diaphragm cup 42 by means of radially extending ears 52 which are spaced at angularly separated intervals about the perimeter of the valve cover 50. The ears 52 of the valve cover 50 may be engaged beneath corresponding radially inwardly projecting, angularly separated lugs 54 at the upper edge of the diaphragm cup 42. As a consequence, the diaphragm cup 42, the valve seat 44, and the valve cover 50 together define a valve enclosure.

A float lever assembly 57 is located atop the valve cover 50. The float lever assembly 57 includes a pair of lever arm stanchions 56 that project vertically upwardly from the valve cover 50. The stanchions 56 support a lever arm 58 for rotation about a horizontal axis at a horizontal, transverse coupling axle pin 60 that extends between the upright lever arm stanchions 56. The lever 58 thereby has a first hinged end 62 through which the fulcrum axle 60 pin passes, and an opposite, free distal actuating end 64.

The tank refill valve assembly 40 has at least one, and preferably a plurality, of outlet ports 66 to the tank 12. In the embodiment of the invention illustrated in FIGS. 2A through 4 the outlet ports 66 are formed as longitudinal ducts aligned parallel to the fluid supply tube 14 and form narrow, rectangular openings where they intersect the inner and outer wall surface of the diaphragm cup 42. The outlet ports 66 are in flow communication with the flow ducts 45 in the valve seat 44. The molded plastic structure that forms the fluid supply tube 14 and the diaphragm cup 42 defines therebetween a manifold chamber 65 for the outlet ports 66. The tank refill valve 40 is operable between a valve seating position illustrated in FIGS. 2A and 2B in which the diaphragm 48 blocks fluid flow from the supply passageway 15 of the fluid supply tube 14 to the outlet ports 66, and a valve unseating position, illustrated in FIGS. 3A and 3B, which permits fluid flow from the supply tube 14 to the outlet ports 66 as illustrated.

Figure 2A:
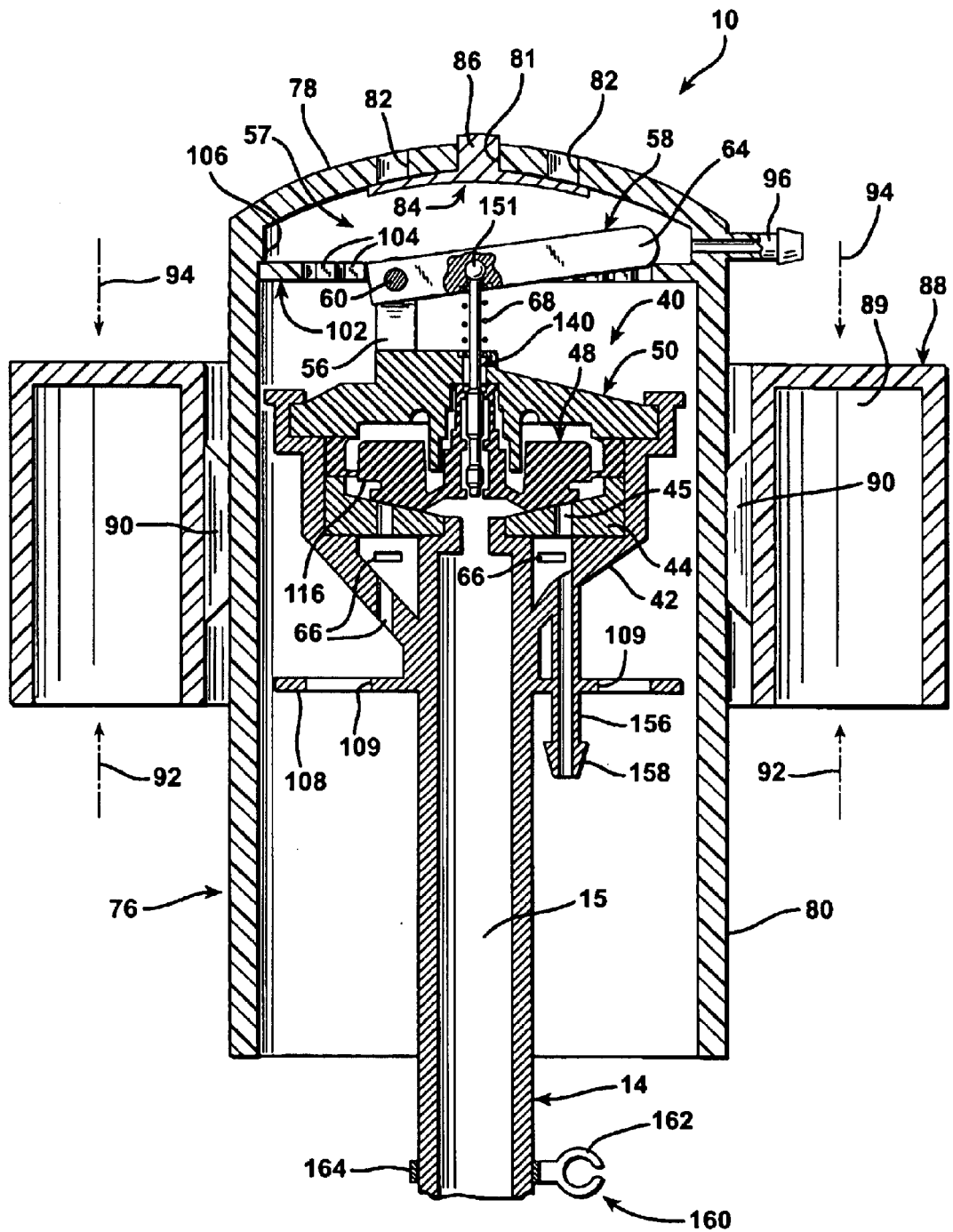
FIG. 2A is a sectional, elevational view of the refill valve of the invention shown with the body of the valve diaphragm in a seated position.
Figure 2B:
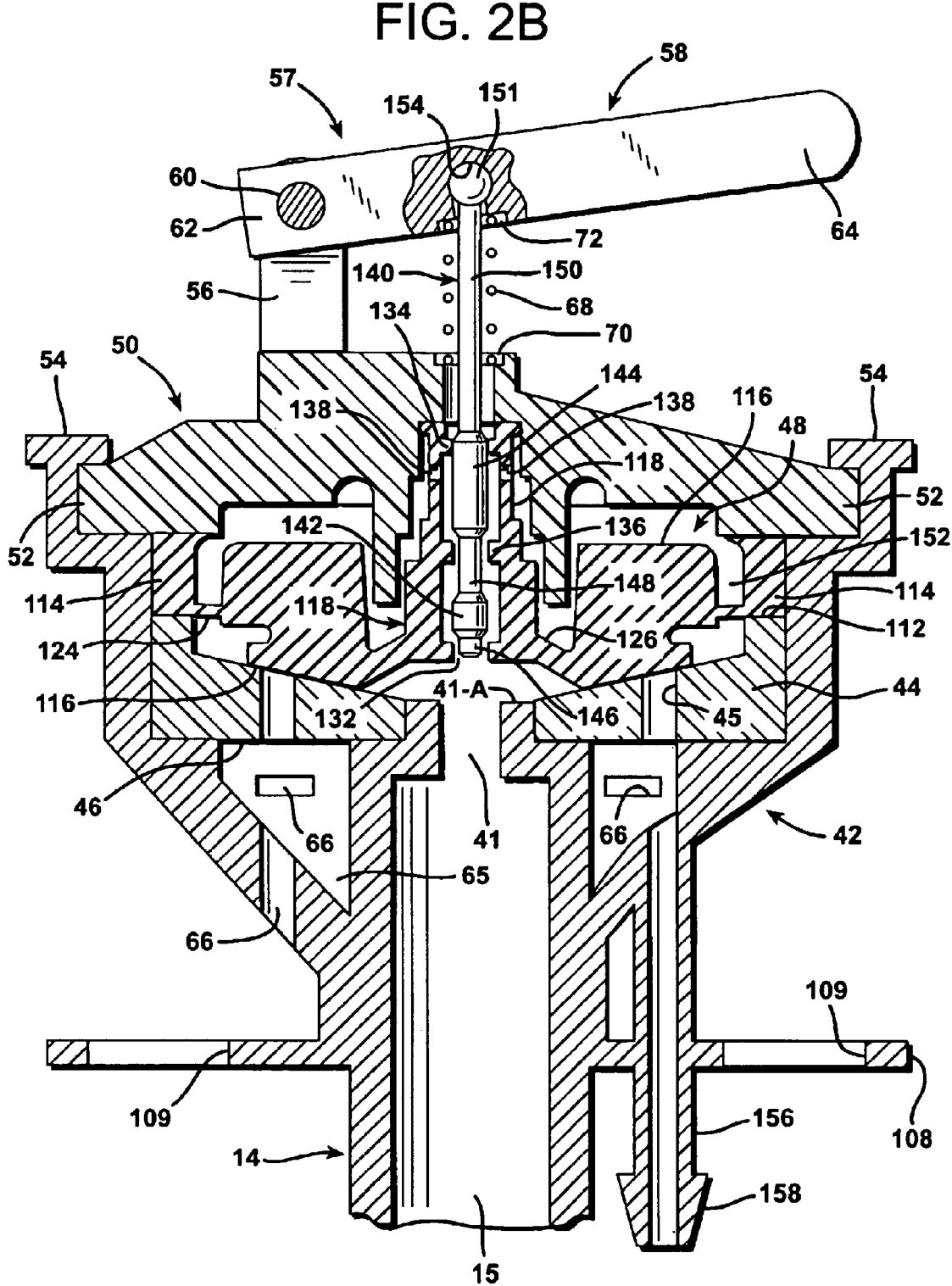
FIG. 2B is an enlarged detail of a portion of FIG. 2A.

The float lever assembly 57 that is locate atop the refill valve 40 has a lever arm 58 that is movable between a raised position to operate the refill valve 40 to one of the valve seating and unseating positions and a lowered position to operate the refill valve 40 to the other of the valve seating and unseating positions. In the embodiment of the invention illustrated in FIGS. 1–5A, the lever arm 58 is movable to raised position to operate the valve 40 to seat the diaphragm 48 on the valve seat 44, as illustrated in FIGS. 2A and 2B. Alternatively, the lever arm 58 is also operable to a lowered position, illustrated in FIGS. 3A and 3B, to operate the refill valve 40 to a condition in which the diaphragm 48 is unseated from the valve seat 44.

A wire coil spring 68 is positioned atop the valve cover 50 and is stabilized in a shallow spring seat 70 defined therein to bias the float lever arm 58 toward the raised position illustrated in FIGS. 2A and 2B. The upper end of the biasing spring 68 is seated in a shallow, annular spring seat 72 defined in the underside of the lever 58.

As illustrated in FIGS. 1, 2A, 3A, 5, and 5A, an inverted, cup-shaped valve actuating hood 76 is disposed atop the float lever assembly 57. The valve actuating hood 76 is formed with a dome-shaped roof 78 and a cylindrical, annular skirt 80 depending from the roof 78 and surrounding the refill valve 40. The roof 78 of the hood 76 is formed with a central aperture 81 therein. A plurality of angularly spaced antisiphon vent apertures 82 are located at a spaced radial distance from the central aperture 81.

A soft rubber fluid deflector 84 is provided and has an upwardly projecting mounting post 86 that extends into and is frictionally engaged by the central aperture 81 in the roof 78. The peripheral edges of the fluid deflector 84 extends beyond the openings 82. The fluid deflector 84 thereby prevents the flow of fluid upwardly out from beneath the confines of the roof 78, but permits air to be drawn in from above the roof 78 through the apertures 82 to prevent siphoning in the event that the flowing water from the refill valve 40 starts to create a vacuum in the space immediately beneath the roof 78.

A buoyant, ring-shaped float 88 is engaged with the skirt 80 of the valve actuating hood 76. The skirt 80 has a cylindrical, annular shape and the float 88 also has an annular configuration and is disposed about the outer surface of the skirt 80 and in contact therewith. More specifically, the float 88 is provided with a plurality of longitudinally elongated, radially inwardly projecting ribs 90, angularly spaced about the inner circumference of the float 88. The ribs 90 contact the outer surface of the skirt 80 and reside in frictional engagement therewith. As illustrated by the directional arrows 92 in FIG. 2A, the float 88 may be pushed longitudinally upwardly along the outer surface of the skirt 80 to force the float 88 to a position closer to the roof 78 of the hood 76. Alternatively, the float 88 may be pushed longitudinally downwardly as indicated by the directional arrows 94 along the outside of the skirt 80 to reposition the float 88 to a distance further from the roof 78 of the hood 76. The float 88 will remain in the longitudinal position relative to the hood 76 to which it is forced and thereafter carry the hood 76 therewith in response to rising and falling water levels within the tank 12.

In the embodiment of the invention illustrated in FIGS. 2A through 3B, the hood 76 is equipped with a refill tube 96 in the form of a hollow nipple that projects radially outwardly from the skirt 80 proximate the roof 78. As illustrated in FIG. 1, the tank 12 is provided with an overflow pipe 32 that extends upwardly from the tank bottom 16 to a level below the refill tube 96 in the hood 76. The rubber refill hose 34 is coupled to the refill tube 96 and empties into the overflow pipe 32, as illustrated in FIG. 1. Water can thereby be forced from the interior enclosure within the hood 76 outwardly through the refill tube 96 formed by a nipple, and through the rubber hose 34 to perform the usual toilet refilling function.

When the float 88 is in the position illustrated in FIG. 1 in which the water 13 rises to the maximum level 100 just beneath the top of the overflow pipe 32 during refilling of the tank 12 with water, the float 88 will rise, carrying with it the hood 76, since the float 88 is immobilized relative to the skirt 80 of the hood 76 by frictional engagement therewith. More specifically, when the tank 12 is refilled with water, and as the level of the water approaches the maximum water level 100 illustrated in FIG. 1, the buoyancy of the float 88 will raise the hood 76 slightly, just enough so that the distal end 64 of the valve actuating lever 58 is no longer depressed downwardly toward the tank floor 16 by the weight of the hood 76. To the contrary, once the float 88 has lifted the hood 76 a distance of about one-half inch, the biasing force of the coil spring 68 will force the distal end 64 of the valve lever 58 upwardly from the lowered position illustrated in FIGS. 3A and 3B to the raised position illustrated in FIGS. 2A and 2B. When this occurs, the refill valve 40 will shut off the flow of water from the inlet supply tube 14 to the valve outlet ports 66, thus shutting off the flow of water filling the toilet through the refill hose 34 to the overflow pipe 32. The float 88 will thereafter maintain the hood 76 so that there is a slight clearance between the underside of the roof 78 and the free, distal, actuating end 64 of the valve lever 58, as illustrated in FIG. 2A.

In some instances there may be enough friction between the valve lever arm 58 and its mounting structure that the force of the compressed spring 68 is insufficient to ensure that the distal, actuating end 64 of the lever arm 58 is raised sufficiently to completely close the valve 40. To ensure that the distal end 64 of the lever arm 58 is raised when the float 88 rises, the system is provided with some type of lever arm-engaging projection extending radially inwardly from the skirt 80 of the hood 76. This lifting aid engages the actuating tip 64 of the lever arm 58 from beneath to push the lever arm 58 upwardly to the raised position illustrated in FIG. 2A as fluid level in the tank 12 rises. The force of the compressed spring 68 also aids in this action, although by employing a lifting aid the spring 68 is not absolutely necessary for the valve 40 to operate.

Figure 6:
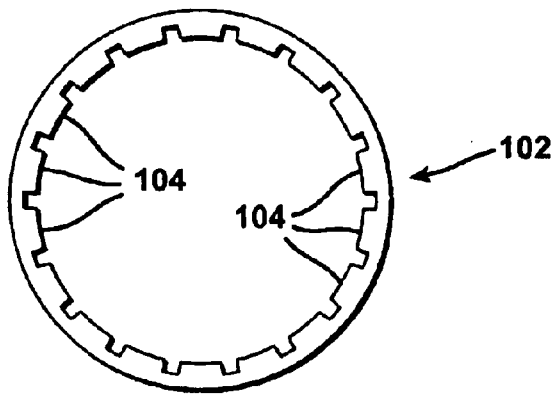
FIG. 6 is a top plan view of the lever lift assist ring shown in FIGS. 5 and 5A, illustrated in isolation.

To this end an annular lever-engaging lift ring 102 is provided. The lift ring 102 is illustrated in isolation in the plan view shown in FIG. 6. The lever-engaging lift ring 102 has a plurality of radially inwardly directed teeth 104 that extend into the confines of the hood 76 a distance just sufficient to engage the underside of the very extreme tip of the actuating end 64 of the lever arm 58, as illustrated in FIG. 2A.

The periphery of the lever arm-engaging ring 102 is set beneath a downwardly facing ledge formed by a radially inwardly projecting portion 106 of the upper end of the interior wall of the skirt 80 of the hood 76. The lever-engaging lift ring 102 is assembled into the hood 76 by pushing it longitudinally from the open end of the skirt 80 toward the roof 78 until the ring 102 seats against the ledge formed by the upper extremity 106 of the interior wall of the skirt 80. When the hood 76 is placed atop the refill valve 40, during the installation process, it is necessary to force the hood 76 downwardly relative to the lever 58 so that the radially inwardly projecting teeth 104 of the lever-engaging lift ring 102 reside beneath the distal end 64 of the lever 58. This is possible since the lever-engaging lift ring 102 is formed of a resilient plastic material that allows the lever 58 to be pushed past and clear the teeth 104 so that the teeth 104 reside beneath the tip of the lever-engaging end 64 of the lever 58.

Also, in the preferred embodiments of the invention, the fluid supply tube 14 is provided with a hood guide member in the form of a disc-shaped structure 108 having large flow openings 109 defined therethrough. The hood guide 108 projects radially outwardly from the upright fluid supply tube 14 near the upper extremity thereof. The guide member 108 is a narrow, transverse, annular disc-shaped structure that projects radially outwardly from the outer surface of the fluid supply tube 14 to a diameter slightly less than the interior diameter of the skirt 80 of the hood 76. A clearance of only a few millimeters between the outer periphery of the hood guide member 108 and the inner surface of the skirt 80 of the hood 76 is sufficient to allow the hood 76 to move longitudinally freely relative to the refill valve 40, within the constraints provided by the operating mechanism of the system. Nevertheless, the hood guide 108 very effectively limits the extent to which the skirt 80 of the hood 76 can tilt relative to the upright fluid supply tube 14. The hood guide 108 thereby ensures that the hood 76 remains substantially in coaxial alignment with the upright fluid supply tube 14.

The float 88 is formed as a hollow, concave downwardly facing, annular sleeve disposed about the skirt 80 of the hood 76. The float 88 thereby forms an inverted, annular, channel-shaped cavity 89, closed at the top and within which air is entrapped.

The float is rendered buoyant by the air entrapped within the cavity 89 and above the water that fills the tank 12. Since the air within the cavity 89 is lighter than the water 13, the float 88 will be buoyed upwardly and will rise slightly relative to the fluid inlet tube 14 as the level of water 13 within the tank 12 approaches the maximum level 100 illustrated in FIG. 1.

When the tank 12 is filled in its normal condition illustrated in FIG. 1, the lever arm 58 will reside in its raised position illustrated in FIGS. 2A and 2B in which the refill valve 40 is closed. On the other hand, when the toilet is flushed by opening of the stopper 26 from the valve seat 28, the water 13 rapidly rushes downwardly through the opening of the valve seat 28. The hollow, inverted, cup-shaped hood 76 thereupon drops down so that its weight is exerted on the actuating end 64 of the lever 58 through contact therewith by the roof 78 of the hood 76. The weight of the hood 76 thereupon overcomes the biasing force of the spring 68 and forces the actuating end 64 of the lever 58 downwardly to the position illustrated in FIGS. 3A and 3B.

Since there is no longer water 13 in the tank 12 to support the buoyant, donut-shaped float 88, the refill valve 40 will be opened, as will hereinafter be described, to allow the passage of water from the fluid supply outlet 41 of the fluid inlet supply tube 14, beneath the diaphragm 48 and out to the valve outlet ports 66 to refill the tank 12. The refill valve 40 remains open until the stopper drops back onto the valve seat 28 and the water level again approaches the maximum level 100 so that the float 88 is buoyed up. The rising level of the water 13 lifts the hood 76 with it and relieves the lever 58 of the weight of the hood 76 as the water level approaches the maximum level 100. The rising teeth 104 of the lever lifting ring 102, assisted by the coil spring 68, thereupon rotates the lever 58 about its fulcrum pin 60 to close the valve 40 so that refilling of the tank 12 is terminated.

The structural configuration of the refill valve 40 represents a very important aspect of the present invention. Specifically, the valve seat 44 of the diaphragm support provides a floor that defines an inner, annular diaphragm seat 110 and an outer, annular diaphragm seat 112 disposed coaxially about the fluid supply inlet tube 14. The fluid outlet ports 66 from the diaphragm cup 42 are located between the fluid supply outlet 41 and the outer diaphragm seat 112 and beneath the inner, annular diaphragm seat 110.

As best illustrated in FIGS. 2A through 4, the valve diaphragm 48 has a peripheral, annular rim 114 seated on the outer diaphragm seat 112. The diaphragm 48 also includes an annular port sealing body 116 and a central, annular, tubular core 118 that defines a longitudinal passage 120 therethrough. The annular, port sealing body 116 is located between the peripheral rim 114 and the central core 118 of the diaphragm 48. The diaphragm 48 also includes an outer, resilient, annular web 124 that joins the peripheral diaphragm rim 114 to the port sealing body 116 and an inner, resilient, annular web 126 that joins the port sealing body 116 to the central core 118.

The central diaphragm core 118 has an upper end 128 and a lower end 130. The core 118 defines a lower, annular, radially inwardly directed sealing ring 132 at its lower end 130 and an upper, radially inwardly directed, annular sealing ring 134 at its upper end 128. The core 118 also defines and delineates an intermediate, radially inwardly directed sealing ring 136. The intermediate sealing ring 136 is located between the upper end 128 and the lower end 130 of the core 118. The lower sealing ring 132, the upper sealing ring 134, and the intermediate sealing ring 136 project radially into the longitudinal passage 120 defined axially through the structure of the diaphragm core 118. The core 118 further defines at least one, and preferably a pair, of diametrically opposed bleed apertures 138 that extend radially through the structure of the wall of the hollow core 118. The bleed apertures 138 are located between the upper sealing ring 134 and the intermediate sealing ring 136.

The refill valve 40 is also provided with an elongated brass or stainless steel metering pin 140. The metering pin 140 is disposed in the longitudinal passage 120 and has a plurality of radially enlarged sealing portions 142 and 144 and radially reduced portions 146, 148, and 150. The radially enlarged sealing portions 142 and 144 alternate with the radially reduced portions 146, 148, and 150.

The float lever assembly 57 is coupled to the metering pin 140 by the spherical knob 151 at the upper extremity of the metering pin 140. The knob 151 is seated in a corresponding socket 154 defined in the underside of the lever arm 58. The plastic from which the lever arm 58 is molded is resilient enough to accept the knob 151, but stiff enough to hold it entrapped in the socket 154. The float lever assembly 57 is operable to alternatively advance and retract the metering pin 140 in the longitudinal passage 120 between a valve unseating position, illustrated in FIGS. 3A, 3B, 5, and 5A, and a valve seating position, illustrated in FIGS. 2A and 2B.

When the metering pin 140 is in the valve unseating position illustrated in FIGS. 3A, 3B, 5, and 5A, the enlarged sealing portions 142 and 144 of the metering pin 140 respectively reside in sealing engagement with the lower sealing ring 132 and with the intermediate sealing ring 136 of the diaphragm core 118. Concurrently, the radially reduced portion 150 of the metering pin 140 permits fluid flow through the bleed apertures 138 and out of the upper end 128 past the upper sealing ring 134 of the longitudinal passage 120. In the valve seating position, the enlarged sealing portion 144 of the metering pin 140 resides in sealing engagement with the upper sealing ring 134, while the radially reduced portions 148, and 146 of the metering pin 140 permit metered flow of water from the supply tube outlet 41 past the lower sealing ring 132 and the intermediate sealing ring 136 and through the bleed apertures 138.

Figure 3A:
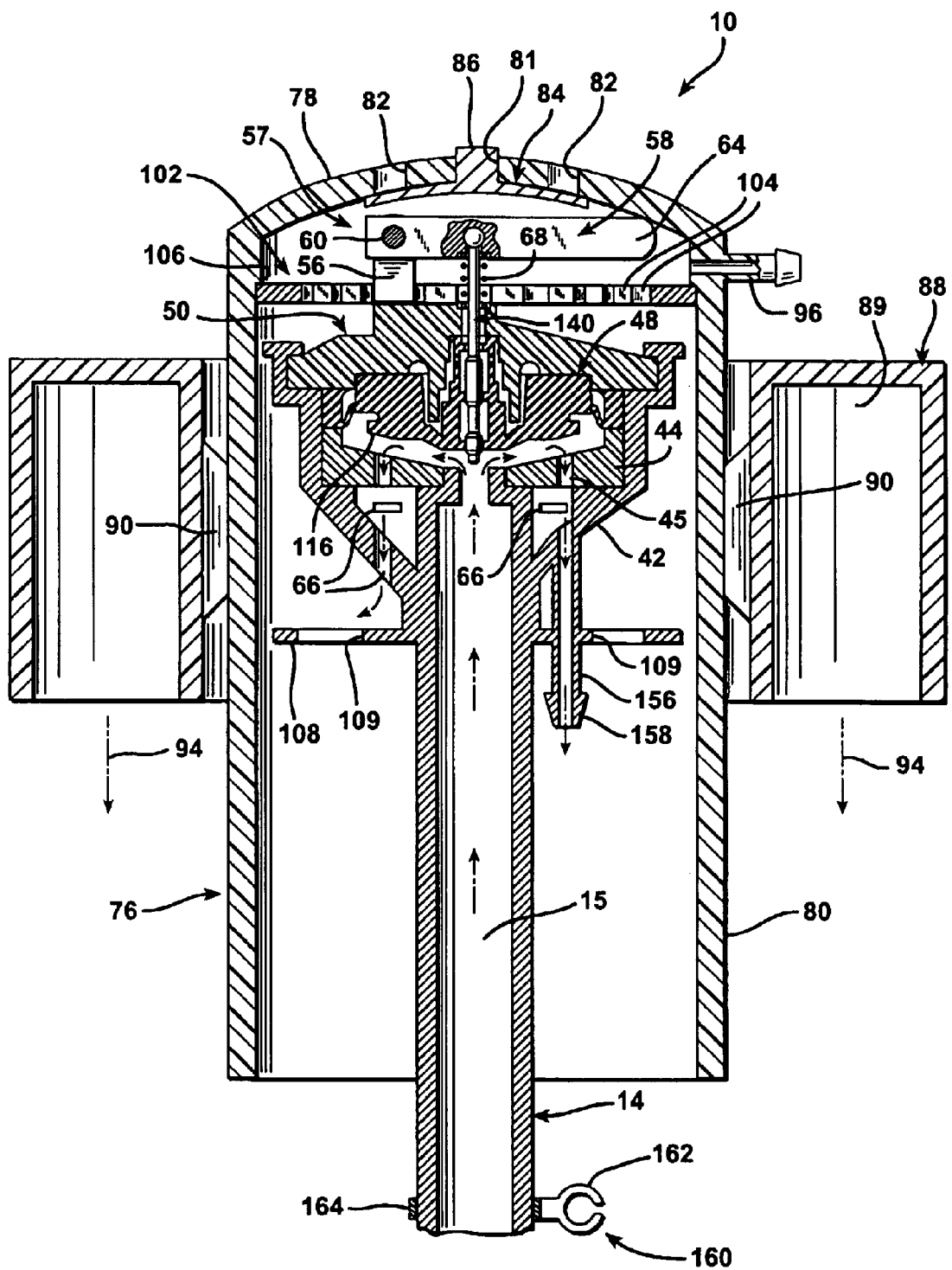
FIG. 3A is a sectional elevational view of the refill valve of the invention shown with the body of the valve diaphragm in its unseated position.
Figure 3B:
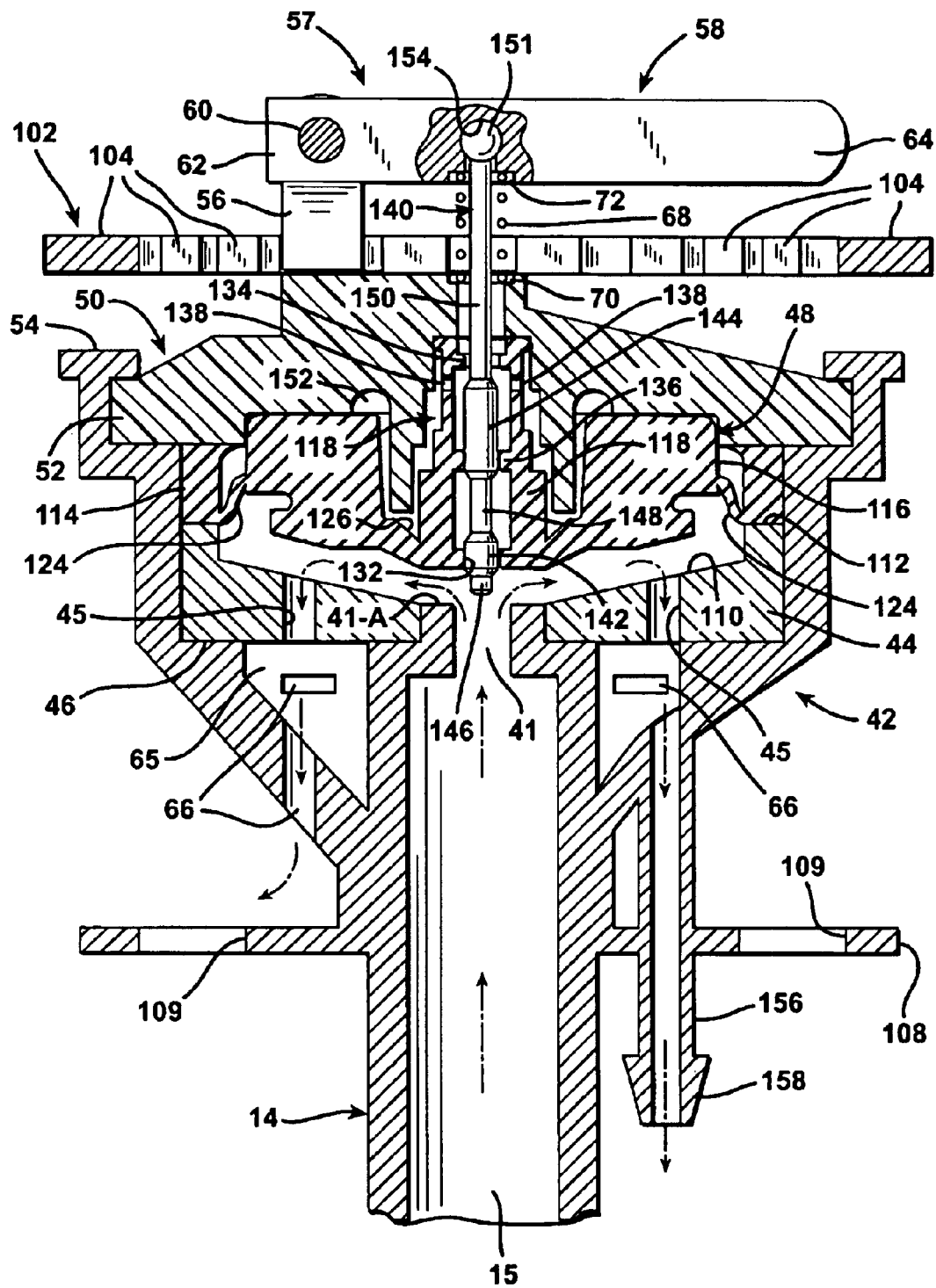
FIG. 3B is an enlarged detail of a portion of FIG. 3A.

As best illustrated in FIGS. 2B and 3B, the valve cover 50 is secured atop the diaphragm cup 42 and against the peripheral diaphragm rim 114 to establish fluid-tight seals between the peripheral diaphragm rim 114 and the diaphragm cup 42. In addition, the valve cover 50 also establishes a fluid-tight seal with the upper end 128 of the diaphragm core 118 above the bleed apertures 138. The diaphragm core 118 moves relative to the valve cover 50. The valve cover 50 and the diaphragm 48 thereby define a back-pressure chamber 152 therebetween within the valve enclosure formed by the valve cover 50, the diaphragm cup 42, and the valve seat 44. The volume of the back-pressure chamber 152 varies, depending upon the operating position of the refill valve mechanism 40.

The radially enlarged sealing portions of the metering pin 140 include a lower enlarged sealing portion 142 located above a radially reduced tip 146 and an upper enlarged portion 144 located above the lower enlarged portion 142. The enlarged portions 142 and 144 are separated from each other by the radially reduced portion 148 at a distance equal to the distance between the lower sealing ring 132 and the intermediate sealing ring 136 of the diaphragm core 118. The upper enlarged portion 144 of the metering pin 140 has a length shorter than the distance between the upper sealing ring 134 and the intermediate sealing ring 136 of the diaphragm core 118.

The diaphragm 48 employed in the preferred embodiments of the invention illustrated in the drawings is precisely the same diaphragm utilized in the FLUIDMASTER® 400A fill valve. Consequently, while dimensions of the metering pin 140 may be varied to work with other diaphragms, there are certain preferred dimensions of the metering pin 140 that should be utilized so that the diaphragm 48 of the FLUIDMASTER® 400A fill valve will function properly.

Specifically, the radially reduced tip 146 of the metering pin 140 in the embodiment of the invention illustrated in FIGS. 1 through 5A should be 0.057 inches in diameter. The enlarged sealing portion 142 should be 0.062 inches in diameter. The radially reduced portion 148 of the metering pin 140 should be 0.048 inches, while the enlarged sealing portion 144 should be 0.050 inches. The radially reduced portion 150 of the metering pin 140 should be 0.040 inches in diameter.

If the metering pin 140 is constructed with these dimensions, there will be an appropriate metered flow of water to fill the back-pressure chamber 152 to thereby force the annular body portion 116 of the diaphragm 48 downwardly against the annular diaphragm seat 110 of the valve seat 44 and at the same time the lower end 130 of the core 118 is forced down upon the diaphragm core seat 41-A to prevent water from flowing up from the fluid supply tube 14 and radially outwardly to the valve outlet port 66 when the lever 58 is in the raised position illustrated in FIGS. 2A and 2B.

In the operation of the invention illustrated in drawing FIGS. 1–5A, the lever 58 is much shorter than the lever provided in the FLUIDMASTER® 400A fill valve. The reduction of the length of the lever 58 has the advantages previously described. The valve actuating lever 58 fits within the confines of the cup-shaped hood 76 and is actuated in a clockwise, downward rotation, as viewed in FIGS. 2A through 3B, about the fulcrum axle pin 60 when the water level drops from the maximum level 100 indicated in FIG. 1. When the level of the water 13 in the tank 12 falls from the maximum level 100, the float 88 drops with the falling water level, thus allowing the weight of the hood 78 to bear downwardly upon the lever 58 with the roof 78 forcing the distal, actuating end 64 of the lever 58 from the position illustrated in FIGS. 2A and 2B to the position illustrated in FIGS. 3A and 3B. This action overcomes the bias of the spring 68 and forces the metering pin 140 downwardly. The upper enlarged sealing portion 144 of the metering pin 140 is thereby pushed from its sealing engagement with the upper sealing ring 134 downwardly into sealing engagement with the intermediate sealing ring 136. Concurrently, the lower enlarged sealing portion 142 of the metering pin 140 is forced into sealing engagement with the lower sealing ring 132.

The result of this movement of the metering pin 140 is that the back pressure that had built up by water entering the back-pressure chamber 152 is relieved, since water can thereupon be vented from the back-pressure chamber 152 through the bleed apertures 138, up alongside the upper, radially reduced portion 150 of the metering pin 140, through the annular orifice defined between the outer surface of the radially reduced portion 150 and the upper sealing ring 134. Water from the back-pressure chamber 152 is thereupon ejected upwardly through the opening in the upper end 128 of the diaphragm 48. The fluid deflector 84 in the roof 78 of the hood 76 prevents the upward spray of water from being ejected through the antisiphon openings 82.

Concurrently, the upper enlarged sealing portion 144 of the metering pin 140 maintains a seal with the intermediate sealing ring 136 while the lower enlarged sealing portion 142 of the metering pin 140 maintains a seal with the lower sealing ring 132. Thus, the lower portion of the passage 120 is sealed at both ends. Sediment, particulate matter, and scum which may have entered or formed in the back-pressure chamber 152 cannot pass downwardly into the lower portion of the passage 120 through the core 118.

During the same time, the onrushing water from the pressurized fluid supply tube 14 pushes the valve body 116 upwardly off of the inner, annular diaphragm seat 110 of the valve seat 44 so that a relatively large volume of water can flow from the fluid supply tube 14 up through the fluid supply outlet 41, radially outwardly between the underside of the diaphragm 48 and the valve seat 44, then downwardly through the flow ducts 45 in the valve seat 44 and out of the valve cup 42 through the outlet ports 66 located therewithin.

It should be noted that when the lever 58 is in the lowered position illustrated in FIGS. 3A and 3B, the lower radially enlarged sealing portion 142 of the metering pin 140 forms a fluid-tight seal with the lower sealing ring 132. This prevents any sediment, particulate matter, scum, or other foreign matter from entering the lower end 126 of the core 118 of the diaphragm 48 during the time that a large volumetric flow of water rushes past the lower diaphragm core end 126 to fill the tank 12 through the outlet ports 66. Thus, unlike conventional systems, there is a double seal about the metering pin 140, both at the lower sealing ring 132 and at the intermediate sealing ring 136, while the tank 12 is being refilled with water.

As the level of the water 13 rises in the tank 12, the buoyant float 88 will be lifted by the rising water level as the water level approaches the maximum water level 100 illustrated in FIG. 1. When this occurs the downward pressure on the operating end 64 of the lever 58 is removed as the hood 76 is lifted by the float 88 and the roof 78 of the hood 76 rises upwardly. The upward force of the radially inwardly projecting teeth 104 of the lever assisting ring 102 that is secured in the hood 76 thereupon forces the lever 58 in counterclockwise rotation, considered with respect to FIGS. 2A through 3B, until the lever 58 returns to its raised position illustrated in FIGS. 2A and 3B. That is, the tips of the teeth 104 engage the underside of the operating end 64 of the lever 58 and push it upwardly as the hood 76 is forced upwardly by the buoyancy of the float 88. Also, the lever 58 is assisted in this upward, counterclockwise movement by the spring 68. However, the spring 68 is actually an optional feature of the refill valve 40.

Once the lever 58 has been rotated to its raised position illustrated in FIGS. 2A and 2B, the metering pin 140 is lifted so that the upper enlarged portion 144 thereof is moved out of sealing engagement with the intermediate sealing ring 136 and into sealing engagement with the upper sealing ring 134 of the core 118 of the diaphragm 48. Concurrently, the lower enlarged portion 142 is lifted out of sealing engagement with the lower sealing ring 132 at the lower end 126 of the core 118 of the diaphragm 48, thereby leaving an annular orifice between the lower sealing ring 132 and the reduced diameter portion 146 of the metering pin 140.

As a consequence, a small, metered flow of water is forced by pressure within the water supply tube 14 up through the annular orifice between the reduced diameter portion 146 of the metering pin 140 and the lower sealing ring 132, upward through the lower portion of the core passage 120, and through the annular orifice that exists between the reduced diameter portion 148 of the metering pin 140 and the intermediate sealing ring 136. By this time the upper enlarged diameter portion 144 of the metering pin 140 has established a fluid-tight seal with the upper sealing ring 134 at the upper end 128 of the core 118 of the diaphragm 48. Consequently, the metered flow of water alongside the metering pin 140 progresses upwardly and is forced radially outwardly through the bleed openings 38 and into the back-pressure chamber 152.

As water is forced into the back-pressure chamber 152, the water pressure therein builds and forces the annular body portion 116 of the diaphragm 48 downwardly against the inner, annular diaphragm seat 110 of the valve seat 44. The relatively thin web portions 124 and 126 of the diaphragm 48 readily yield to allow the water pressure built up in the back-pressure chamber 152 to force the diaphragm body portion 116 downwardly into sealing engagement with the annular diaphragm seat 110. Also, the lower surface 130 of the diaphragm core 118 is forced down onto the valve core seat 41-A. The relatively large ratio of area in the back-pressure space 152 above the body portion 116 of the diaphragm 48 relative to the valve seat surface at the inner, annular diaphragm seat 110 of the valve seat 44 ensures a positive seal, thus blocking the flow of water from the supply tube outlet 41 to the outlet ports 66.

The foregoing cyclical process is repeated each time the toilet is flushed. The two seals at the intermediate sealing ring 136 and the lower sealing ring 132 of the diaphragm 48 greatly reduce the likelihood of clogging of the core passage 120 through the diaphragm 48 despite prolonged, recurrent use.

The float 88 and the hood 76 travel reciprocally only a very short distance during the cyclic operation of the refill valve 40. Specifically, the maximum travel of the float 88 and hood 76 is only about one-half of an inch, as illustrated by a comparison of the positions of these components in FIGS. 1 and 5. Also, as shown in those drawing figures, the guide 108 ensures that the hood 76 remains in very near precise coaxial alignment with the water inlet tube 14 so that there is practically no variation in the water level at which the roof 78 of the hood 76 establishes contact and leaves contact with the distal end 64 of the valve lever 58.

In the embodiment of the invention illustrated in FIGS. 1 through 6, the toilet is refilled by flow through the refill outlet port nipple 96 and the rubber refill hose 34 that empties into the overflow pipe 32. However, it may be considered more desirable for the toilet refill water hose 34 to be totally stationary, rather than subject to the slight movement caused by the change in vertical level resulting from the rise and fall of the float 88. Consequently, in the embodiment illustrated the valve cup 42 is also provided with a downwardly extending refill tube 156 that terminates in a nipple 158. The refill tube 156 leads from the manifold chamber 65 for the outlet ports 66, so that as water flows out of the outlet ports 66, it also flows out of the refill tube 156.

Figure 7:
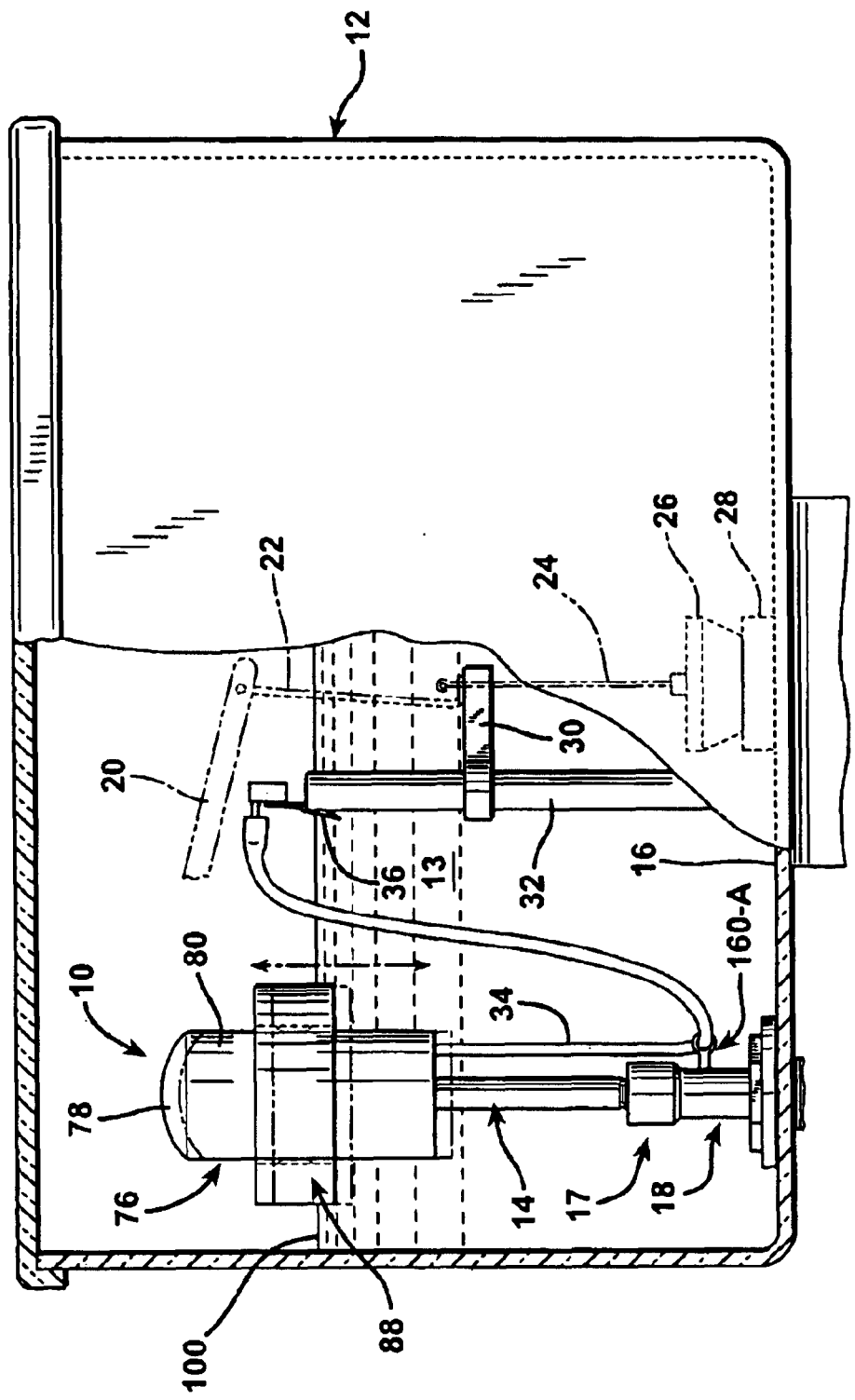
FIG. 7 is an elevational view, partially broken away, showing a modification of the fluid tank valve assembly illustrated in FIG. 1.

If desired, the embodiment of the invention illustrated in FIGS. 1 through 6 can be modified as illustrated in FIG. 7. In this arrangement the refill outlet 96 from the hood 76 has been deleted, so that the only outlet from the hood 76 is through the opening formed at the bottom of the skirt 80. The refill hose 34, formed in an appropriate length, is thereby routed from the nipple 158 downwardly, alongside the fluid inlet supply tube 14 and beneath the lower edge of the skirt 80 of the hood 76, then back upwardly where it is coupled to the clip 36 and empties into the overflow pipe 32, as illustrated in FIG. 7.

In this connection it may be desirable for hose clips to be provided to ensure that the refill hose 34 does not interfere with the vertical, reciprocal movement of the hood 76 relative to the water supply tube 14. For example, and as illustrated in FIGS. 2A and 3A, a clip 160 may be provided to serve as a refill tube guide to ensure that the refill hose 34 does not make contact with the lower edge of the skirt 80 of the hood 76. The refill tube guide clip 160 may be formed as a plastic, clip-on structure that includes a C-shaped hose guide portion 162 having an interior diameter suitable for receiving the refill hose 34 therewithin, and a larger, C-shaped clip-on portion 164. The portion 164 extends over an arc slightly larger than a semicircle and is resilient enough so that it can be clipped onto the water inlet supply tube 14 and will remain in position by frictional engagement therewith, as illustrated in FIG. 2A. The refill hose 34 may thereupon be routed downwardly from the nipple 158 at the end of the refill tube 156, through the hose guide portion 162, and then back up to the clip 36 at the top of the refill pipe 32. The refill tube guide clip 160 thereby ensures that the refill hose 34 does not interfere with the vertical movement of the hood 76.

It is to be understood that many different types of refill tube guides might be employed. For example, the refill tube guide may be formed as a molded, radially extending appendage on the water supply tube 14, rather than a clip-on device. Alternatively, the refill tube guide may be formed as either a clip-on or integrally molded part of the inlet supply tube mounting coupling 17, as illustrated at 160-A in FIG. 7. In any event, the tank refill hose guide is an optional feature of the invention.

Another novel aspect of the invention resides in the construction of the hollow, cylindrical, annular mounting coupling 17 for the water inlet supply tube 14. The hollow mounting coupling 17 at the lower extremity of the upright fluid supply tube 14 provides for adjustment of the vertical level of the refill valve 40 within the tank 12. Some form of height adjustment is necessary, since there is a considerable variation in the overall height of toilet tanks 12 and the height of the upper ends of the refill pipes 32 located therewithin.

Figure 8:
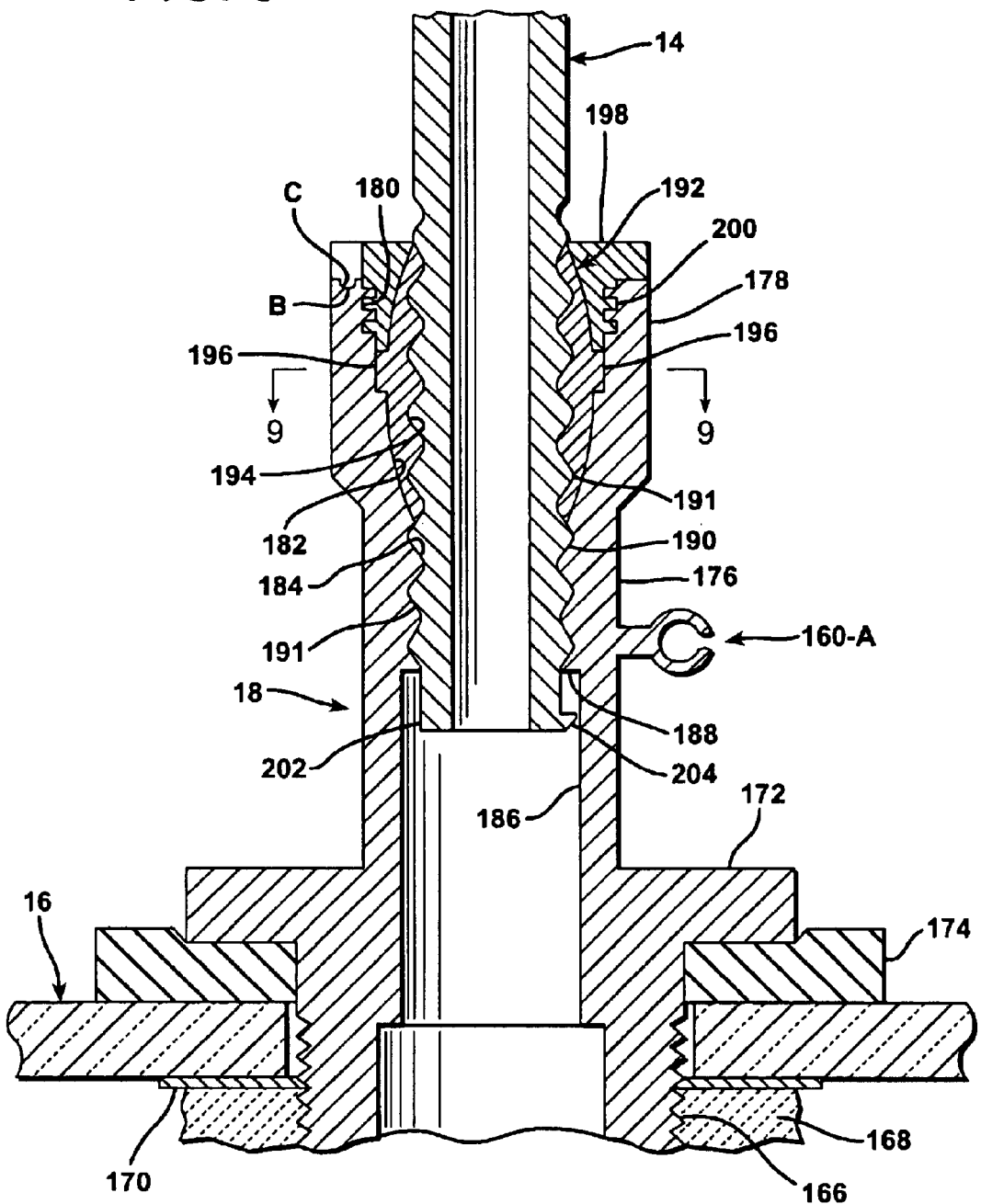
FIG. 8 is a sectional elevational detail of the coupling employed in the fluid tank valve assembly illustrated in FIG. 7.
Figure 9:
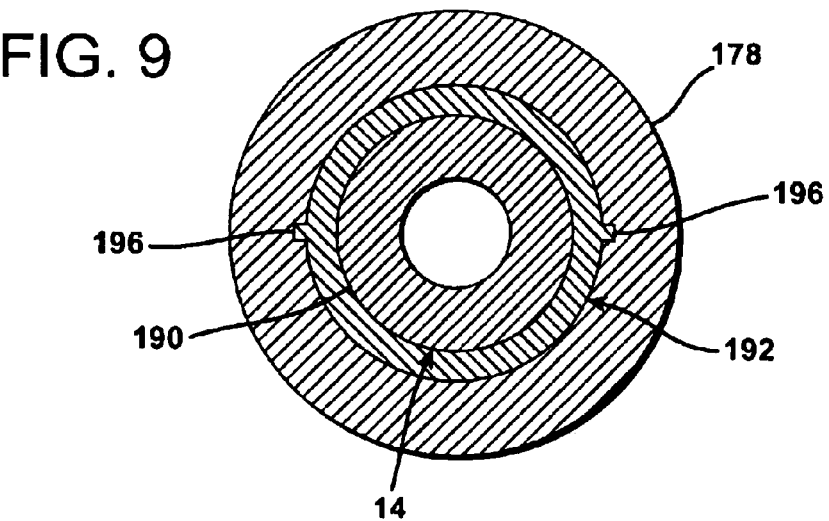
FIG. 9 is a transverse, sectional detail taken along the lines 9—9 in FIG. 8.
Figure 10:
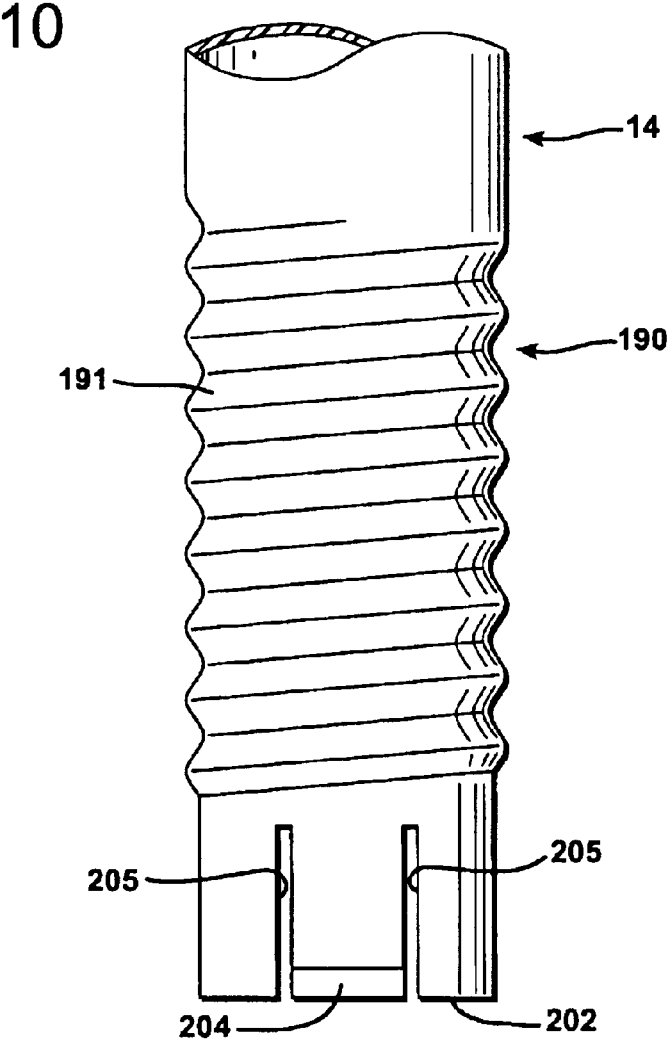
FIG. 10 is a side elevational detail of the lower end of the upright fluid supply tube shown in FIG. 9.

In conventional systems, such as the FLUIDMASTER® 400A fill valve, the upright fluid supply tube and the mount for attachment to the bottom 16 of the tank 12 are provided as separate structures which are threadably engaged together and secured to each other by means of a compression ring. This arrangement is illustrated and described in prior U.S. Pat. No. 4,100,928. In my own prior U.S. Pat. No. 4,122, 862, I describe an alternative height adjustment mechanism. However, the component parts of that mechanism were also completely detachable, one from another. I have since discovered that it is more desirable for the fluid supply tube 14 to be permanently engaged in and sealed fluid-tight to the hollow, cylindrical, annular mount 18 that is secured to the bottom 16 of the tank 12, but for the fluid supply tube 14 to also be longitudinally adjustable relative to the mount 18. FIGS. 8, 9, and 10 of the application drawings illustrate such an adjustable coupling system 17.

As illustrated in those drawing figures, the hollow, annular mount 18 is formed with an externally threaded nipple 166 at its lower extremity which passes through an opening in the bottom 16 of the tank 12. A nut 168 is engaged with the nipple 166 and bears against a washer 170 located on the underside of the tank bottom 16. Within the tank 12, the mount 18 includes an annular flange 172 that bears downwardly on another gasket 174. The nut 168 is tightened so that the gaskets 170 and 174 establish a fluid-tight seal between the mount 18 and the tank bottom 16. This portion of the mounting coupling 17 is conventional.

Above the flange 172 the hollow mount 18 defines a lower, internally threaded barrel section 176 that extends axially upwardly from the flange 172 and terminates at its upper end in an enlarged mouth 178, which includes an interiorly threaded cavity 180 at its upper extremity. The cavity 180, at its lower end, communicates with a reduced diameter sealing chamber 182, which in turn communicates at its lower end with the helically threaded female surface 184 of the barrel 176.

The mount 18 also defines within its structure below the barrel 176 a cavity 186 having an internal diameter greater than the internal diameter of the barrel 176 formed by the threads 184. The mount 18 further defines a downwardly facing, annular ledge 188 that forms a demarcation between the internally threaded barrel 176 and the larger diameter cavity 186. The lower end 190 of the upright fluid supply tube 14 has external threads 191 formed thereon which are threadably engaged with the internal threads 184 in the barrel 176.

The coupling 17 also includes an elastomeric, externally rounded seal 192, having an ellipsoid shaped outer surface with a major axis coaxial with the alignment of the fluid supply tube 14 and a minor axis perpendicular thereto at its longitudinal center. The elastomeric seal 192 is internally threaded with female threads 194 that have the same pitch diameter as the threads 184 of the barrel 176 of the mount 18. The elastomeric seal 192 is also provided with radially outwardly projecting locking ears 196 at its longitudinal center. The locking ears 196 may be formed in a variety of configurations, such as half round, square, oval, or rectangular radial projections from the ellipsoid outer surface of the seal 192. The purpose of the locking ears 196 is to interact with a corresponding abutment ledge formed between the reduced inner diameter portion 182 and the portion 178 of the mount 18 located immediately thereabove.

The coupling 17 is also provided with a hollow, annular compression nut or cap 198 which has a snap lock B which receives a recess C in the top surface of the mouth 178 when the cap 198 rests on the top surface of the mouth 178. The mouth 178 has an interior surface that is curved to conform to the upper portion of the ellipsoid surface of the seal 192. The compression nut 198 is externally threaded at 200 with threads that engage the threaded cavity 180 of the interiorly threaded mouth 178 of the mount 18.

The foregoing features of the coupling 17 of the invention are described in my prior U.S. Pat. No. 4,122,862. However, the coupling 17 represents an improvement over that system. Specifically, in the coupling 17 the lower extremity 202 of the lower end 190 of the fluid inlet supply tube 14 is configured with a catch in the form of a toe 204 that, when unrestrained, extends radially outwardly beyond the external threads 191 on the lower end 190 of the fluid supply tube 14. The toe 204 is preferably delineated by a pair of longitudinal slots 205 defined through the structure of the lower extremity 202 of the fluid supply tube 14, as illustrated in FIG. 10. The toe 204 is, in essence, formed on the tip of a spring arm formed from the structure of the lower extremity 202 of the fluid inlet supply tube 14.

The toe 204 is thereby resiliently deflectable radially inwardly to pass through the internally threaded barrel 176 of the mount 18 as the lower end 190 of the supply tube 14 is threadably advanced into the barrel 176. However, once the toe 204 advances past the demarcation ledge 188 between the barrel 176 and the cavity 186, the toe 204 springs radially outwardly upon entering the cavity 186 in the mount 18. In this way the toe 204 at the lower extremity of the fluid inlet supply tube 14 and the ledge 188 at the demarcation between the cavity 186 and the barrel 176 of the mount 18 interact to prevent complete separation of the supply tube 14 from the mount 18 while permitting longitudinal adjustment therebetween.

Adjustment of the effective length of the fluid inlet tube 14, and thus the height of the refill valve 40 above the floor 16 of the tank 12 is performed by backing off the compression nut 198 from its seated position illustrated in FIG. 8. With radial inward pressure released from the elastomeric seal 192, the lower extremity of the fluid inlet supply tube 114 can be screwed further downwardly toward the bottom 16 of the tank 12 by advancing the threads 191 further into the barrel 176 to reduce the height of the valve 40 above the tank floor 16. Alternatively, the fluid inlet supply tube 14 may be unscrewed relative to the barrel 176 so that the lower extremity 202 of the fluid inlet supply tube 14 is withdrawn upwardly away from the tank floor 16. However, the toe 204 serves as a catch and a safeguard to prevent the fluid inlet supply tube 14 from being completely withdrawn and separated from the mount 18.

Once the fluid supply tube 14 has been threadably advanced or backed out of the mount 18 so that the refill valve 40 is at the desired height, the snap locking compression nut 198 is tightened by threadably advancing it downwardly so that the threads 200 thereof fully engage the threaded section 180 of the mouth 178 of the mount 18. At this point the snap lock B of nut 198 has snapped into recess C in the top surface of the mouth 178 located on top of the mount 18. The interiorly curved surface of the compression nut 198 thereby provides both a longitudinal downward and radially inward force against the elastomeric seal 192, which compresses the interior surface of the seal 192 against the threads 191 of the lower end 190 of the fluid inlet supply tube 14. The forces applied by the compression nut 198, through the elastomeric seal 192, will still allow longitudinal movement of the lower end 190 of the fluid supply tube 14 relative to the mount 18 only by manual adjustment.

The embodiment of the invention illustrated in FIGS. 1 through 6 represents the preferred embodiment of the invention. It has between twelve and fourteen fewer parts than the FLUIDMASTER® 400A fill valve. In the embodiment of FIGS. 1 through 6, the metering pin 140 includes a lower enlarged sealing portion 142 located above a radially reduced tip 146. The metering pin 140 also includes an upper radially enlarged sealing portion 144 located above the lower enlarged portion 142 and separated therefrom by a distance equal to the distance between the lower sealing ring 132 and the intermediate sealing ring 136 of the diaphragm core 118. The upper enlarged sealing portion 144 of the metering pin 140 has a length shorter than the distance between the upper sealing ring 134 and the intermediate sealing ring 136 of the diaphragm core 118.

In this arrangement the float lever assembly 57 includes a lever fulcrum mount in the form of mounting posts 56 and the lever arm 58 has a fulcrum at the fulcrum pin 60 hinged for rotation relative to the fulcrum mounting post 56 about a horizontal axis. The lever arm 58 includes an opposite, distal actuating end 64. The metering pin 140 has an upper knob 151 at its upper extremity that is coupled to a socket 154 of the lever arm 58 between the fulcrum mount 60 and the actuating end 64 of the lever arm 58. However, this lever arm arrangement provides a direction of metering pin movement that is the reverse of that in the conventional, widely commercially available FLUIDMASTER® 400A fill valve. Therefore, another embodiment of the invention may be employed that utilizes the same lever arrangement that already exists in the FLUIDMASTER® 400A fill valve.

Figure 11:
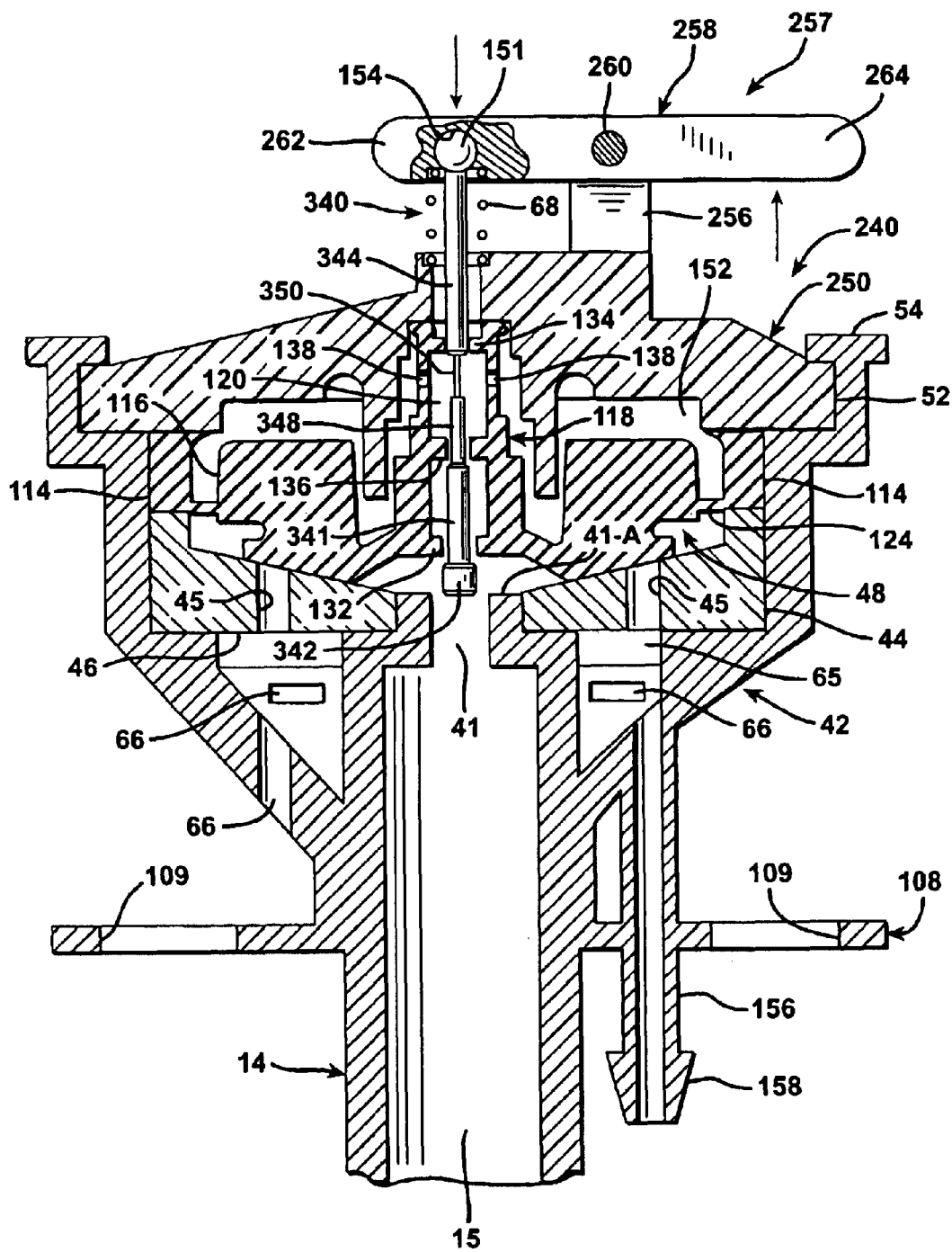
FIG. 11 is a sectional, elevational detail illustrating a modification of the refill valve of the invention shown in FIGS. 2A through 3B with the diaphragm shown in its seated position.
Figure 12:
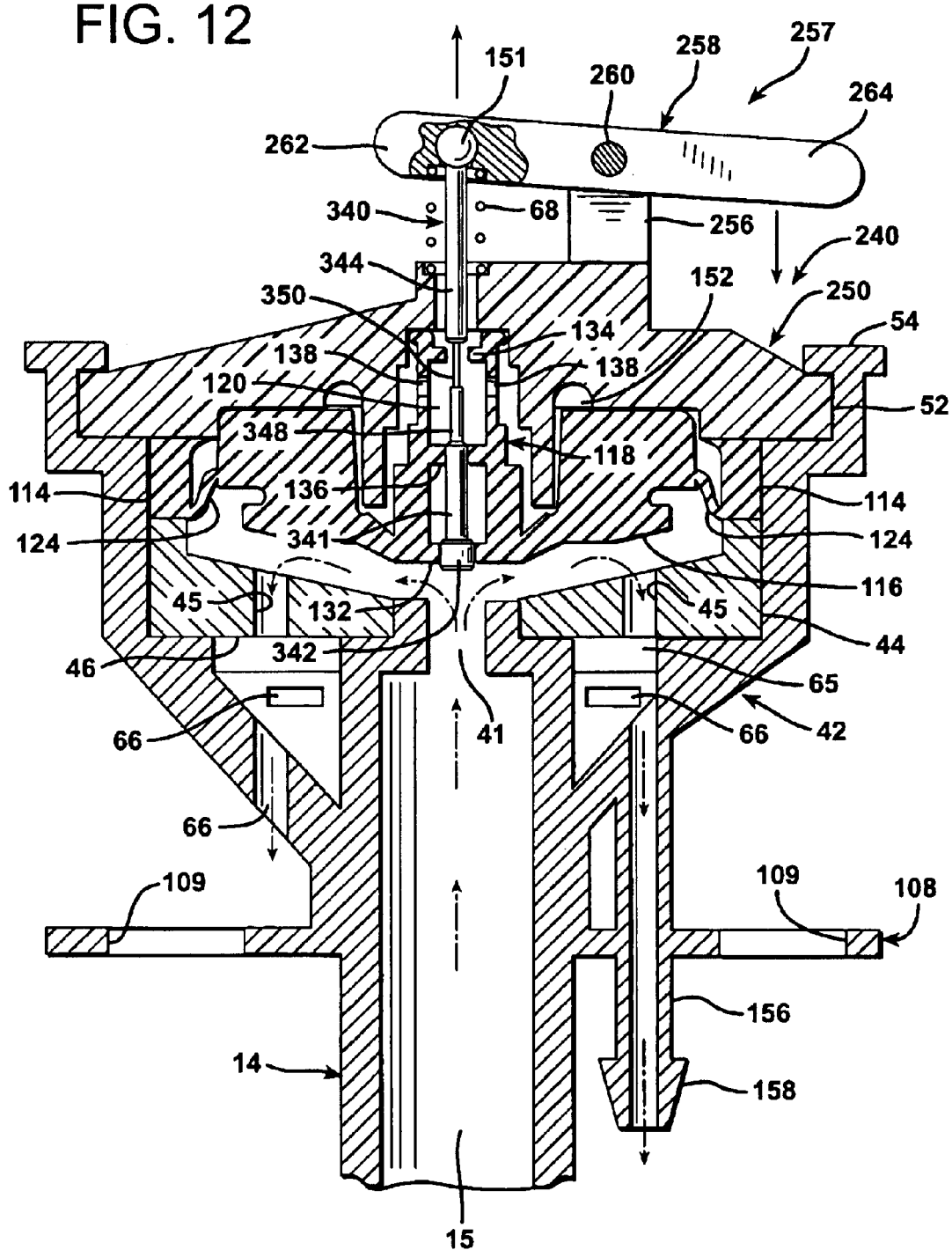
FIG. 12 is a sectional, elevational detail illustrating a modification of the refill valve of the invention shown in FIGS. 2A through 3B with the diaphragm shown in its unseated position.

FIGS. 11 and 12 illustrate a refill valve 240 having a float lever assembly 257 that closely resembles that of the FLUIDMASTER® 400A fill valve. More specifically, the metering pin 340 shown in the embodiment of FIGS. 10 and 11 has an upper end that terminates in a knob 151 like that of the metering pin 140. The float lever assembly 257 includes a lever fulcrum mount in the form of mounting posts 256 that support a lever arm 258 for rotation about a fulcrum axle pin 260. The lever arm 258 has a first end 262 that is coupled to the knob 151 at the upper end of the metering pin 340 by a ball and socket connection, as in the embodiment of FIGS. 1–6. The second, opposite end 264 of the lever arm 258 is a free, actuating end. The lever arm 258 is coupled to the lever fulcrum mounting posts 256 between the first lever end 262 and second lever end 264 for rotation about a horizontal axis formed by the fulcrum axle pin 260.

It can be seen that the operation of the lever arm 258 in the embodiment of FIGS. 10 and 11 is opposite that of the lever arm 58 shown in the embodiment of the invention illustrated in FIGS. 1–6. The action of the lever arm assembly 257 is the same as in the existing FLUIDMASTER® 400A fill valve. Specifically, when the actuating end 264 of the lever arm 258 is raised, the metering pin 340 is lowered to the position that causes the valve diaphragm 48 to seat against the valve seat 44 and seal the water outlet 41 of the water inlet tube 14 from communication with the outlet ports 66, as illustrated in FIG. 11. This action is performed by lowering the metering pin 340, whereas the metering pin 140 is raised to accomplish the same result.

By the same token, when the actuating end 264 of the lever arm 258 is pressed downwardly, as illustrated in FIG. 12, the metering pin 340 is raised to the position that unseats the diaphragm 48 from the valve seat 44, and allows water under pressure to flow up the upright inlet supply tube 14, through the outlet 41 thereof, radially outwardly beneath the raised body portion 116 of the diaphragm 48, and down through the outlet ducts 45 of the valve seat 44 and out through the outlet ports 66, as illustrated in FIG. 12. Thus, movement of the actuating end 264 of the lever arm 258 to its lowered position causes movement of the metering pin 340 to operate the valve 240 to its unseated position.

To accomplish this result, the metering pin 340 must be reconfigured to provide different radially enlarged and radially reduced portions from those employed in the metering pin 140. More specifically, the metering pin 340 provides a radially enlarged sealing portion 342 as a lower plug at the lower extremity of the metering pin 340. In addition, a distal radially enlarged portion 341 is located immediately above the lower plug 342. The metering pin 340 also includes an upper, proximal radially enlarged portion 348 separated from the distal enlarged portion 341 by the radially reduced portions 348 and 350 of the metering pin 340.

The refill valve 240 employs the same diaphragm 48, diaphragm cup 42, and valve seat 44 as the refill valve 40. The valve cover 250 of the embodiment shown in FIGS. 10 and 11 is shaped the same as the valve 50 on its undersurface, but has a different configuration on its exposed top so as to reposition the fulcrum posts 256 to the opposite side of the metering pin from the stanchions 56 in the embodiment of FIGS. 1–6.

For the metering pin 340 to operate properly with the same diaphragm 48 previously described, the various radially enlarged and radially reduced portions of the metering pin 340 should be dimensioned appropriately. More specifically, the lower, enlarged, sealing plug 342 of the metering pin 340 preferably has a diameter of 0.062 inches, while the distal enlarged sealing portion 341 located immediately thereabove has an outer diameter of 0.050 inches. The radially reduced portion 348 of the metering pin 340 has an outer diameter of 0.048 inches, while the reduced diameter portion 350 has an outer diameter of 0.040 inches. The proximal radially enlarged diameter sealing portion 344 of the metering pin 340 has the same diameter as the distal enlarged sealing portion 341, which is 0.050 inches.

The operation of the refill valve 240 may be described in the following manner. When the hood 76 descends due to falling water level, the roof 78 of the hood 76 bears downwardly against the actuating end 264 of the float lever assembly 257 to force the lever arm 258 to rotate in a clockwise direction to rotate the lever 258 from the position illustrated in FIG. 11 to that illustrated in FIG. 12. When this occurs, the opposite end 262 of the lever 258 pulls the metering pin 340 upwardly, thereby drawing the lower plug 342 into sealed engagement with the lower sealing ring 132 of the diaphragm 48. At the same time, the distal radially enlarged sealing portion 341 of the metering pin 340 is drawn upwardly into sealing engagement with the intermediate sealing ring 136. Concurrently, the proximal radially enlarged portion 344 of the metering pin 340 is pulled upwardly, out of sealed engagement with the upper sealing ring 134.

By raising the metering pin 340, a flow path is created to vent water from the back-pressure chamber 152 radially inwardly through the bleed openings 138 and upwardly through the upper portion of the passage 120 through the annular orifice that exists between the upper sealing ring 134 and the reduced diameter portion 350 of the metering pin 340 at the upper end 128 of the diaphragm 48. As pressure drops within the back-pressure chamber 152 due to the outflow of water upwardly through the upper end 128 of the diaphragm core 118, the pressure from the fluid supply tube 14 unseats the body portion 116 of the diaphragm 48, as illustrated in FIG. 12. Water then flows freely up through the outlet 41 of the fluid inlet supply tube 14, radially outwardly beneath the body portion 116 of the diaphragm 48, and down through the outlet ducts 45 of the valve seat 44 and out through the outlet ports 66 of the diaphragm cup 42.

As in the other embodiments illustrated, the lower portion of the passage 120 is sealed both from above and below by the seals established between the plug 342 and the lower sealing ring 132 and the distal enlarged portion 341 of the metering pin 340 and the intermediate sealing ring 136. Particulate matter, scum, sediment, and other potentially clogging materials that may have collected in the back pressure chamber 152 are thereby discharged upwardly through the upper end 128 of the core 118, past the orifice formed between the reduced diameter portion 350 of the metering pin 340 and the upper sealing ring 134 of the diaphragm core 118. The lower portion of the passage 120 is protected from contaminants by the double sealing arrangement with the intermediate sealing ring 136 and the lower sealing ring 132 as illustrated in FIG. 12.

Once the water level rises, the float 88 lifts the hood 76 upwardly, whereupon the radially inwardly projecting teeth 104 of the lever lift assisting ring 102 engage the underside of the actuating tip 264 of the lever 258. The upward force applied by the lifting ring 102 causes the lever 258 to rotate in a counterclockwise direction from the lowered position illustrated in FIG. 12 to the raised position illustrated in FIG. 11. When this occurs the metering pin 340 is forced downwardly overcoming the bias of the spring 68. The proximal radially enlarged portion 344 of the metering pin 340 is forced downwardly into sealed engagement with the upper sealing ring 134 of the diaphragm core 118 while the distal radially enlarged portion 341 and the lower end plug 342 of the metering pin 340 are forced out of sealed engagement, respectively, with the intermediate sealing ring 136 and the lower sealing ring 132.

This movement of the metering pin 340 permits upward, metered flow of water through the annular orifices respectively formed between the distal, radially enlarged sealing portion 341 and lower sealing ring 132 and the reduced diameter portion 348 and the intermediate sealing ring 136. Water thereby passes upwardly into the passage 120 in the diaphragm core 118, but is blocked from further upward flow by the seal between the proximal radially enlarged sealing portion 344 of the metering pin 340 and the upper seal 134 of the diaphragm core 118. However, the water thereupon flows radially outwardly through the bleed openings 138 and into the back pressure chamber 152. As pressure builds within the back-pressure chamber 152, the body portion 116 of the diaphragm 48 is forced downwardly by flexure of the web sections 124 and 126, to again seal off the outlet ports 66 from the water in the fluid inlet supply 14.

Undoubtedly, numerous variations and modifications of the present invention will become readily apparent to those familiar with ballcock valves and their operation. For example, the float 88 need not be formed with a downwardly facing annular opening, but could be constructed as an enclosed, hollow, donut-shaped ring frictionally engaged with the skirt 80 of the hood 76. Also, the float 88 is not necessarily engaged with the hood 76 by the force of friction. On the contrary, the skirt 80 can be formed with external threads that are engaged by internal threads on the facing surface of the float 88. Thus, the longitudinal position of the float 88 along the length of the hood 76 can be altered by threadably advancing or backing off the float relative to the skirt of the hood. Other variations and modifications of the invention are also possible. Accordingly, the scope of the invention should not be construed as limited to the specific embodiments depicted and described, but rather is defined in the claims appended hereto.

I claim:
1. A fluid tank valve assembly comprising:
   a tank having a bottom,
   an upright fluid supply tube projecting upwardly relative to said bottom of said tank, a tank refill valve located atop said fluid supply tube and having at least one outlet port to said tank therefrom and operable between a valve seating position blocking fluid flow from said fluid supply tube to said outlet port and a valve seating position permitting fluid flow from said fluid supply tube to said outlet port, a float lever assembly located atop said refill valve and having a lever arm movable between a raised position to operate said refill valve to one of said valve seating and unseating positions and a lowered position to operate said valve to the other of said valve seating and unseating positions, an inverted, cup-shaped valve actuating hood disposed atop said float lever assembly, wherein said valve actuating hood has a roof and a skirt depending from said roof and surrounding said refill valve, and a buoyant float engaged with said skirt of said valve actuating hood and adjustably positionable along said skirt to a selected distance from said roof, whereby said roof of said hood bears downwardly against said lever arm to force said lever arm to said lowered position until fluid level in said tank rises sufficiently to cause said float to lift said valve actuating hood and move said lever arm to said raised position, further characterized in that said fluid supply tube terminates in a fluid supply outlet at its upper extremity and said refill valve is comprised of:

a flexible, resilient, annular valve diaphragm housed within a valve enclosure atop said fluid supply outlet and operable to alternatively seal and unseal said fluid supply outlet and having a central, annular tubular core that defines a longitudinal passage theretrough, wherein said core has upper and lower ends and defines a lower sealing ring at said lower end, an upper sealing ring at said upper end, and an intermediate sealing ring located between said upper and lower ends, and said lower, upper and intermediate sealing rings project radially into said longitudinal passage, and said core further defines at least one bleed aperture located between said upper and intermediate sealing rings and extending radially through said core, a metering pin disposed in said longitudinal passage and having a plurality of radially enlarged sealing portions and radially reduced portions arranged longitudinally thereon, a float lever assembly coupled to said metering pin and operable to alternatively advance and retract said metering pin in said longitudinal passage between a valve unseating position in which said enlarged sealing portions of said metering pin reside in sealing engagement with said lower and intermediate sealing rings of said diaphragm while said radially reduced portions permit fluid flow through said at least one bleed aperture and out of said upper end of said longitudinal passage so that said diaphragm unseals said fluid supply outlet, and a valve seating position in which one of said enlarged sealing portions of said metering pin resides in sealing engagement with said upper sealing ring while said radially reduced portions of said metering pin permit metered flow of fluid from said supply tube outlet past said lower and intermediate sealing rings and through said at least one bleed aperture so that said diaphragm seals said fluid supply outlet, and a spring biasing said float lever arm toward said raised position.

2. A fluid tank valve assembly according to claim 1 wherein said refill valve is further comprised of a diaphragm support surmounting said upright supply tube at said fluid supply outlet, and said diaphragm support has a floor defining an inner annular diaphragm seat and an outer annular diaphragm seat disposed coaxially about said outlet, and said at least one outlet port is located between said inner and outer diaphragm seats, and said valve diaphragm has:

a peripheral, annular rim seated on said outer diaphragm seat, an annular port sealing body located above said inner diaphragm seat and between said peripheral rim and said central core, an outer resilient annular web joining said peripheral rim to said port sealing body, and an inner, resilient, annular web joining said port sealing body to said central core, and a valve cover secured atop said diaphragm support and against said peripheral diaphragm rim to establish fluid-tight seals between said peripheral diaphragm rim and said diaphragm support and with said upper end of said diaphragm core above said at least one bleed aperture, whereby said diaphragm support and said valve cover together define said valve enclosure, and said valve cover and said diaphragm define a back-pressure chamber therebetween within said valve enclosure.

3. A fluid tank valve assembly comprising:

a tank having a bottom, an upright fluid supply tube projecting upwardly relative to said bottom of said tank, a tank refill valve located atop said fluid supply tube and having at least one outlet port to said tank therefrom and operable between a valve seating position blocking fluid flow from said fluid supply tube to said outlet port and a valve seating position permitting fluid flow from said fluid supply tube to said outlet port, a float lever assembly located atop said refill valve and having a lever arm movable between a raised position to operate said refill valve to one of said valve seating and unseating positions and a lowered position to operate said valve to the other of said valve seating and unseating positions, an inverted, cup-shaped valve actuating hood disposed atop said float lever assembly, wherein said valve actuating hood has a roof and a skirt having a cylindrical, annular shape depending from said roof and surrounding said refill valve, and a buoyant float formed as a hollow, concave downwardly facing annular sleeve disposed about and engaged with said skirt of said valve actuating hood in contact therewith, wherein said float includes a plurality of radially inwardly protruding projections that contact and reside in frictional engagement with said skirt to prevent frictional binding of said float relative to said skirt, and whereby said float is immobilized relative to said skirt by frictional engagement therewith and is adjustably positionable along said skirt to a selected distance from said roof and said float is rendered buoyant by air entrapped therewithin above the level of a fluid heavier than air in said tank, and whereby said roof of said hood bears downwardly against said lever arm to force said lever arm to said lowered position until fluid level in said tank rises sufficiently to cause said float to lift said valve actuating hood and move said lever arm to said raised position.

4. A fluid tank valve assembly according to claim 3 wherein said hood is formed with a refill tube through its structure proximate said roof, and said tank has an overflow pipe extending upwardly from said bottom to a level below said refill tube in said hood, and a refill hose is coupled to said refill tube and empties into said overflow pipe.

5. A fluid tank valve assembly comprising:

a tank having a bottom, an upright fluid supply tube projecting upwardly relative to said bottom of said tank, a tank refill valve located atop said fluid supply tube and having at least one outlet port to said tank therefrom and operable between a valve seating position blocking fluid flow from said fluid supply tube to said outlet port and a valve seating position permitting fluid flow from said fluid supply tube to said outlet port, a float lever assembly located atop said refill valve and having a lever arm movable between a raised position to operate said refill valve to one of said valve seating and unseating positions and a lowered position to operate said valve to the other of said valve seating and unseating positions, an inverted, cup-shaped valve actuating hood disposed atop said float lever assembly, wherein said valve actuating hood has a roof and a skirt depending from said roof and surrounding said refill valve, and a buoyant float engaged with said skirt of said valve actuating hood and adjustably positionable along said skirt to a selected distance from said roof, whereby said roof of said hood bears downwardly against said lever arm to force said lever arm to said lowered position until fluid level in said tank rises sufficiently to cause said float to lift said valve actuating hood and move said lever arm to said raised position, wherein said tank refill valve is provided with a refill tube located within the confines of said hood, and said tank has an overflow pipe extending upwardly from said bottom to a level below said roof of said hood, and a refill hose is coupled to said refill tube and extends downwardly beneath said skirt of said hood and upwardly to empty into said overflow pipe from above, further comprising a hood guide member projecting radially outwardly relative to said upright fluid supply tube to limit the extent to which said skirt of said hood can tilt relative to said upright fluid supply tube and said tank refill tube is stationary relative to said hood guide member.

6. A fluid tank assembly according to claim 5 further comprising a refill tube guide attached to said supply tube beneath said skirt of said hood to hold said refill hose close to said supply tube until said refill hose clears the lower edge of said skirt of said hood.

7. A fluid tank valve assembly comprising:

a tank having a bottom, an upright fluid supply tube projecting upwardly relative to said bottom of said tank, a tank refill valve located atop said fluid supply tube and having at least one outlet port to said tank therefrom and operable between a valve seating position blocking fluid flow from said fluid supply tube to said outlet port and a valve seating position permitting fluid flow from said fluid supply tube to said outlet port, a float lever assembly located atop said refill valve and having a lever arm movable between a raised position to operate said refill valve to one of said valve seating and unseating positions and a lowered position to operate said valve to the other of said valve seating and unseating positions, an inverted, cup-shaped valve actuating hood disposed atop said float lever assembly, wherein said valve actuating hood has a roof and a skirt depending from said roof and surrounding said refill valve, a buoyant float engaged with said skirt of said valve actuating hood and adjustably positionable along said skirt to a selected distance from said roof, whereby said roof of said hood bears downwardly against said lever arm to force said lever arm to said lowered position until fluid level in said tank rises sufficiently to cause said float to lift said valve actuating hood and move said lever arm to said raised position, and a lever arm-engaging projection extending radially inwardly from said skirt to engage said lever arm from beneath to push said lever arm upwardly to said raised position as fluid level in said tank rises.

8. A fluid tank valve assembly comprising:

a tank having a bottom, an upright fluid supply rube projecting upwardly relative to said bottom of said tank, a tank refill valve located atop said fluid supply tube and having at least one outlet port to said tank therefrom and operable between a valve seating position blocking fluid flow from said fluid supply tube to said outlet port and a valve seating position permitting fluid flow from said fluid supply tube to said outlet port, a float lever assembly located atop said refill valve and having a lever arm movable between a raised position to operate said refill valve to one of said valve seating and unseating positions and a lowered position to operate said valve to the other of said valve seating and unseating positions, an inverted, cup-shaped valve actuating hood disposed atop said float lever assembly, wherein said valve actuating hood has a roof and a skirt depending from said roof and surrounding said refill valve, a buoyant float engaged with said skirt of said valve actuating hood and adjustably positionable along said skirt to a selected distance from said roof, whereby said roof of said hood bears downwardly against said lever arm to force said lever arm to said lowered position until fluid level in said tank rises sufficiently to cause said float to lift said valve actuating hood and move said lever arm to said raised position, and a skirt guide member projecting radially outwardly relative to said upright fluid supply tube to limit the extent to which said skirt of said hood can tilt relative to said upright fluid supply tube.

9. A fluid tank valve according to claim 8 wherein said bottom of said tank has a fluid inlet therein and further comprising a hollow, cylindrical, annular mount secured to said bottom of said tank at said fluid inlet therein, and said upright fluid supply tube is permanently engaged in and sealed fluid tight to said mount and is also longitudinally adjustable relative thereto.

10. A fluid tank valve assembly comprising:

a tank having a bottom with a fluid inlet therein, an upright fluid supply tube projecting upwardly relative to said bottom of said tank, a tank refill valve located atop said fluid supply tube and having at least one outlet port to said tank therefrom and operable between a valve seating position blocking fluid flow from said fluid supply tube to said outlet port and a valve seating position permitting fluid flow from said fluid supply tube to said outlet port, a float lever assembly located atop said refill valve and having a lever arm movable between a raised position to operate said refill valve to one of said valve seating and unseating positions and a lowered position to operate said valve to the other of said valve seating and unseating positions, an inverted, cup-shaped valve actuating hood disposed atop said float lever assembly, wherein said valve actuating hood has a roof and a skirt depending from said roof and surrounding said refill valve, and a buoyant float engaged with said skirt of said valve actuating hood and adjustably positionable along said skirt to a selected distance from said roof, whereby said roof of said hood bears downwardly against said lever arm to force said lever arm to said lowered position until fluid level in said tank rises sufficiently to cause said float to lift said valve actuating hood and move said lever arm to said raised position, a hollow, cylindrical, annular mount secured to said tank at said fluid inlet therein, and said upright fluid supply tube is permanently engaged in and sealed fluid tight to said mount and is also longitudinally adjustable relative thereto, and wherein said tank refill valve is provided with a refill tube located within the confines of said hood, and said tank has an overflow pipe extending upwardly from said bottom to a level below said roof of said hood, and a refill hose is coupled to said refill tube and extends to said overflow pipe, and further comprising a refill tube guide secured relative to said upright fluid supply tube to receive therewithin said refill hose leading to said overflow pipe.

11. A fluid tank valve assembly comprising:

a tank having a bottom with a fluid inlet thereto, an upright fluid supply tube projecting upwardly relative to said bottom of said tank, a tank refill valve located atop said fluid supply tube and having at least one outlet port to said tank therefrom and operable between a valve seating position blocking fluid flow from said fluid supply tube to said outlet port and a valve seating position permitting fluid flow from said fluid supply tube to said outlet port, a float lever assembly located atop said refill valve and having a lever arm movable between a raised position to operate said refill valve to one of said valve seating and unseating positions and a lowered position to operate said valve to the other of said valve seating and unseating positions, an inverted, cup-shaped valve actuating hood disposed atop said float lever assembly, wherein said valve actuating hood has a roof and a skirt depending from said roof and surrounding said refill valve, a buoyant float engaged with said skirt of said valve actuating hood and adjustably positionable along said skirt to a selected distance from said roof, whereby said roof of said hood bears downwardly against said lever arm to force said lever arm to said lowered position until fluid level in said tank rises sufficiently to cause said float to lift said valve actuating hood and move said lever arm to said raised position, and an adjustable coupling for said hollow, upright fluid supply tube secured to said bottom of said tank at said fluid inlet thereto including a hollow, cylindrical annular mount for attachment to said fluid inlet at said bottom of said tank, wherein said hollow, cylindrical annular mount defines a lower, internally threaded barrel and a cavity beneath said barrel having a diameter greater than the interior diameter of said barrel, and a downwardly facing annular ledge between said internally threaded barrel and said cavity, and the lower end of said upright fluid supply tube has external threads and is threadably engaged in said barrel, the improvement wherein the lower extremity of said supply tube is configured with a catch that, when unrestrained, extends radially outwardly beyond said external threads on said lower end of said fluid supply tube, and said catch is resiliently deflectable radially inwardly to pass through said barrel as said lower end of said supply tube is threadably advanced into said barrel, and said catch springs outwardly upon entering said cavity in said mount, whereby said catch and said ledge interact to prevent complete separation of said supply tube from said mount while permitting longitudinal adjustment therebetween.

12. A refill valve comprised of:

an upright fluid supply tube terminating in a fluid supply outlet at its upper extremity, a flexible, resilient, annular valve diaphragm housed within a valve enclosure atop said fluid supply outlet and operable to alternatively seal and unseal said fluid supply outlet and having a central, annular tubular core that defines a longitudinal passage therethrough, wherein said core has upper and lower ends and defines a lower sealing ring at said lower end, an upper sealing ring at said upper end, and an intermediate sealing ring located between said upper and lower ends, and said lower, upper and intermediate sealing rings project radially into said longitudinal passage, and said core further defines at least one bleed aperture located between said upper and intermediate sealing rings and extending radially through said core, a metering pin disposed in said longitudinal passage and having a plurality of radially enlarged sealing portions and radially reduced portions arranged longitudinally thereon, a float lever assembly coupled to said metering pin and operable to alternatively advance and retract said metering pin in said longitudinal passage between a valve unseating position in which said enlarged sealing portions of said metering pin reside in sealing engagement with said lower and intermediate sealing rings of said diaphragm while said radially reduced portions permit fluid flow through said at least one bleed aperture and out of said upper end of said longitudinal passage so that said diaphragm unseals said fluid supply outlet, and a valve seating position in which one of said enlarged sealing portions of said metering pin resides in sealing engagement with said upper sealing ring while said radially reduced portions of said metering pin permit metered flow of fluid from said supply tube outlet past said lower and intermediate sealing rings and through said at least one bleed aperture so that said diaphragm seals said fluid supply outlet.

13. A refill valve according to claim 12 further comprising:

a diaphragm support surmounting said upright supply tube at said fluid supply outlet, and said diaphragm support has a floor defining an inner annular diaphragm seat and an outer annular diaphragm seat disposed coaxially about said inlet, and at least one outlet port located between said inner and outer diaphragm seat, and said valve diaphragm has:
- a peripheral, annular rim seated on said outer diaphragm seat,
- an annular port sealing body located above said inner diaphragm seat and between said peripheral rim and said central core,
- an outer resilient annular web joining said peripheral rim to said port sealing body,
- an inner annular web joining said port sealing body to said central core, and
- a valve cover secured atop said diaphragm support and against said peripheral diaphragm rim to establish fluid-tight seals between said peripheral diaphragm rim and said diaphragm support and with said upper end of said diaphragm core above said at least one bleed aperture, whereby said diaphragm support and said valve cover together define said valve enclosure and said valve cover and said diaphragm define a back-pressure chamber therebetween within said valve enclosure.

14. A refill valve according to claim 12 wherein said radially enlarged sealing portions of said metering pin include a lower, enlarged sealing portion located above a radially reduced tip, and an upper enlarged sealing portion located above said lower enlarged sealing portion and separated therefrom by a distance equal to the distance between said lower sealing ring and said intermediate sealing ring of said diaphragm core, and said upper enlarged sealing portion of said metering pin has a length shorter than the distance between said upper sealing ring and said intermediate sealing ring of said diaphragm core.

15. A refill valve according to claim 14 wherein said float lever assembly includes a lever fulcrum mount and a lever arm which has a fulcrum end hinged for rotation relative to said fulcrum mount about a horizontal axis and having an opposite, distal actuating end, and said metering pin has an upper extremity coupled to said to lever arm between said fulcrum mount and said actuating end of said lever arm.

16. A refill valve according to claim 15, wherein said metering pin has an upper end and said float lever assembly includes a lever fulcrum mount and a lever arm with first and second ends, and said first end of said lever arm is coupled to said upper end of said metering pin and said second end of said lever arm is a free, actuating end, and said lever arm is coupled to said lever fulcrum mount between said first and second ends of said lever arm for rotation about a horizontal axis.

17. A refill valve according to claim 12 wherein said radially enlarged sealing portions of said metering pin include a lower plug, a distal enlarged portion located immediately above said lower plug, and an upper proximal plug separated from said distal enlarged portion by said radially reduced portions of said metering pin, and said radially reduced portions of said metering pin have a combined length longer than the distance between said upper sealing ring and said intermediate sealing ring of said diaphragm core.

* * * * *

UNITED STATES PATENT AND TRADEMARK OFFICE
CERTIFICATE OF CORRECTION

PATENT NO. : 6,712,090 B1  Page 1 of 1
DATED : March 30, 2004
INVENTOR(S) : Anthony R. Brandelli It is certified that error appears in the above-identified patent and that said Letters Patent is hereby corrected as shown below:

<u>Column 13,</u>
Lines 44 and 47, the reference number "126" should be -- 130 --.

<u>Column 19,</u>
Line 7, the word "enlarged" should be -- reduced --.

Signed and Sealed this

First Day of June, 2004

JON W. DUDAS
*Acting Director of the United States Patent and Trademark Office*